US010608779B2

(12) United States Patent
Sun et al.

(10) Patent No.: US 10,608,779 B2
(45) Date of Patent: Mar. 31, 2020

(54) SEARCH SPACE CONFIGURATION FOR NEW RADIO (NR) SYSTEM

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Yang Yang, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 15/887,821

(22) Filed: Feb. 2, 2018

(65) Prior Publication Data

US 2018/0227074 A1 Aug. 9, 2018

Related U.S. Application Data

(60) Provisional application No. 62/455,579, filed on Feb. 6, 2017.

(51) Int. Cl.
*H04L 1/00* (2006.01)
*H04W 72/12* (2009.01)
(Continued)

(52) U.S. Cl.
CPC ............ *H04L 1/001* (2013.01); *H04L 1/0046* (2013.01); *H04L 1/0072* (2013.01); *H04L 5/001* (2013.01);
(Continued)

(58) Field of Classification Search
CPC ....... H04L 1/001; H04L 1/0038; H04L 5/001; H04L 5/0007; H04L 5/0048;
(Continued)

(56) References Cited

U.S. PATENT DOCUMENTS

2010/0302956 A1* 12/2010 Haverty ............... H04K 3/22
370/252
2012/0039283 A1* 2/2012 Chen ............... H04W 72/042
370/329

(Continued)

FOREIGN PATENT DOCUMENTS

EP 2503727 A1 9/2012

OTHER PUBLICATIONS

International Search Report and Written Opinion—PCT/US2018/016814—ISA/EPO—dated May 9, 2018.

(Continued)

*Primary Examiner* — Curtis A Alia
(74) *Attorney, Agent, or Firm* — Holland & Hart LLP

(57) ABSTRACT

Methods, systems, and devices for wireless communication are described a search space configuration. A set of physical resource blocks (PRBs) or resource element groups (REGs) may be configured over two or more modulation symbols. A control channel element (CCE), or fixed set of REGs, may be formed using REGs in one modulation symbol. A search space, or set of decoding candidates, may be configured for one user equipment (UE) or multiple UEs. Search spaces for different UEs may share some CCEs. A decoding candidate for a UE may occupy a set of CCEs; the UE may make decoding to attempts on the set of CCEs. A base station may transmit in a subset of decoding candidates configured for the UE. A demodulation reference signal (DMRS) may be transmitted when a decoding candidate is used, and DMRS may not be transmitted when a decoding candidate is not used.

30 Claims, 21 Drawing Sheets

(51) Int. Cl.
 *H04L 5/00* (2006.01)
 *H04W 72/04* (2009.01)
(52) U.S. Cl.
 CPC .......... *H04L 5/0048* (2013.01); *H04L 5/0053* (2013.01); *H04W 72/1273* (2013.01); *H04L 5/0007* (2013.01); *H04L 5/0094* (2013.01); *H04W 72/042* (2013.01)
(58) Field of Classification Search
 CPC ............... H04L 5/0053; H04L 5/0094; H04W 72/1273; H04W 72/042
 See application file for complete search history.

(56) References Cited

U.S. PATENT DOCUMENTS

| | | | | |
|---|---|---|---|---|
| 2013/0114563 | A1* | 5/2013 | Oizumi | H04L 5/001 370/329 |
| 2013/0176868 | A1* | 7/2013 | Gaal | H04B 7/0404 370/252 |
| 2014/0321421 | A1* | 10/2014 | Popovic | H04L 5/0051 370/330 |
| 2015/0009937 | A1* | 1/2015 | Li | H04L 5/0053 370/329 |

OTHER PUBLICATIONS

NTT Docomo et al., "Monitoring of DL Control Channel for NR", 3GPP Draft; R1-1700620, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), XP051208145, 7 Pages, Retrieved from the Internet: URL:http://www.3gpp.org/ftp/Meetings_3GPP_SYNC/RAN1/Docs/[retrieved on Jan. 16, 2017].

Spreadtrum Communications: "Search space design for MPDCCH", 3GPP Draft; R1-155605 Search Space Design for MPDCCH, 3rd Generation Partnership Project (3GPP), Mobile Competence Centre; 650, Route Des Lucioles; F-06921 Sophia-Antipolis Cedex; France vol. RAN WGI. No. Malmo, Sweden; Oct. 5, 2015-Oct. 9, 2015 Oct. 4, 2015 (Oct. 4, 2015), XP051002469, 5 Pages, Retrieved from the Internet: URL:http:jjhttp://www.3gpp.org/ftp/Meetings 3GPP SYNC/RAN1/Docs/ [retrieved on Oct. 4, 2015].

* cited by examiner

US 10,608,779 B2

SEARCH SPACE CONFIGURATION FOR NEW RADIO (NR) SYSTEM

CROSS REFERENCES

The present Application for Patent claims priority to U.S. Provisional Patent Application No. 62/455,579 by SUN, et al., entitled "Search Space configuration For New Radio (NR) System," filed Feb. 6, 2017, assigned to the assignee hereof.

BACKGROUND

The following relates generally to wireless communication and more specifically to search space configuration for a new radio (NR) system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or an NR system). A wireless multiple-access communications system may include a number of base stations or access network nodes, each simultaneously supporting communication for multiple communication devices, which may be otherwise known as user equipment (UE).

SUMMARY

The described techniques relate to improved methods, systems, devices, or apparatuses that support search space for a decoder. Generally, the described techniques provide for a search space having multiple search sub-spaces. A set of physical resource blocks (PRBs) or resource element groups (REGs) may be configured over two or more modulation symbols. A control channel element (CCE), or fixed set of REGs, may be formed using REGs in one modulation symbol. A search space, or set of decoding candidates, may be configured for one user equipment (UE) or multiple UEs. Search spaces for different UEs may share some CCEs. A decoding candidate for a UE may occupy a set of CCEs; the UE may make decoding to attempts on the set of CCEs. A base station may transmit in a subset of decoding candidates configured for the UE. A demodulation reference signal (DMRS) may be transmitted when a decoding candidate is used, and DMRS may not be transmitted when a decoding candidate is not used.

A method of wireless communication is described. The method may include configuring a UE to monitor a first set of decoding candidates in a first control symbol period of a slot, wherein each decoding candidate in the first set corresponds to at least one control channel element in the first control symbol period, configuring the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set, and transmitting control signaling within a control resource set for the UE in the slot in a control channel element corresponding to one or more decoding candidates of the first set of decoding candidates, one or more decoding candidates of the second set of decoding candidates, or both.

An apparatus for wireless communication is described. The apparatus may include means for configuring a UE to monitor a first set of decoding candidates in a first control symbol period of a slot, wherein each decoding candidate in the first set corresponds to at least one control channel element in the first control symbol period, means for configuring the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set, and means for transmitting control signaling within a control resource set for the UE in the slot in a control channel element corresponding to one or more decoding candidates of the first set of decoding candidates, one or more decoding candidates of the second set of decoding candidates, or both.

Another apparatus for wireless communication is described. The apparatus may include a processor, memory in electronic communication with the processor, and instructions stored in the memory. The instructions may be operable to cause the processor to configure a UE to monitor a first set of decoding candidates in a first control symbol period of a slot, wherein each decoding candidate in the first set corresponds to at least one control channel element in the first control symbol period, configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set, and transmit control signaling within a control resource set for the UE in the slot in a control channel element corresponding to one or more decoding candidates of the first set of decoding candidates, one or more decoding candidates of the second set of decoding candidates, or both.

A non-transitory computer readable medium for wireless communication is described. The non-transitory computer-readable medium may include instructions operable to cause a processor to configure a UE to monitor a first set of decoding candidates in a first control symbol period of a slot, wherein each decoding candidate in the first set corresponds to at least one control channel element in the first control symbol period, configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set, and transmit control signaling within a control resource set for the UE in the slot in a control channel element corresponding to one or more decoding candidates of the first set of decoding candidates, one or more decoding candidates of the second set of decoding candidates, or both.

In some examples of the method, apparatus, and non-transitory computer-readable medium described above, the second set of decoding candidates comprises a repetition of an arrangement of the first set of decoding candidates such that decoding candidates for the UE in the second set may be frequency-aligned with decoding candidates in the first set.

In some examples of the method, apparatus, and non-transitory computer-readable medium described above, the decoding candidates may be defined by one or more aggregation levels in a search space comprising a first set of control channel elements in the first control symbol period and a second set of control channel elements in the second control symbol period.

In some examples of the method, apparatus, and non-transitory computer-readable medium described above, the search space includes the control resource set and the first and second control symbol periods, and wherein the first set of control channel elements and the second set of control channel elements each comprise a sub-search space of the search space.

In some examples of the method, apparatus, and non-transitory computer-readable medium described above, each of the sub-search spaces comprise a same set of PRBs.

In some examples of the method, apparatus, and non-transitory computer-readable medium described above, the first set of decoding candidates and the second set of decoding candidates occupy a same set of frequency resources.

In some examples of the method, apparatus, and non-transitory computer-readable medium described above, the first set of decoding candidates and the second set of decoding candidates each comprise a plurality of control channel element aggregation levels.

In some examples of the method, apparatus, and non-transitory computer-readable medium described above, the first and second set of decoding candidates in the first and second control symbol periods comprise a search space, and wherein the first set of decoding candidates and the second set of decoding candidates each comprise a sub-search space of the search space.

In some examples of the method, apparatus, and non-transitory computer-readable medium described above, each of the sub-search spaces comprise a same set of PRBs.

Some examples of the method, apparatus, and non-transitory computer-readable medium described above may further include processes, features, means, or instructions for transmitting a DMRS in a first decoding candidate of the first set of decoding candidates during the first control symbol period.

In some examples of the method, apparatus, and non-transitory computer-readable medium described above, the DMRS transmitted in a first decoding candidate of the first set aids in decoding a second decoding candidate of the second set of decoding candidates that may be frequency-aligned with the first decoding candidate.

Some examples of the method, apparatus, and non-transitory computer-readable medium described above may further include processes, features, means, or instructions for transmitting a grant of resources for the UE in a control channel element of the first control symbol period corresponding to the first decoding candidate. Some examples of the method, apparatus, and non-transitory computer-readable medium described above may further include processes, features, means, or instructions for determining to leave empty a control channel element of the second control symbol period corresponding to the second decoding candidate.

Some examples of the method, apparatus, and non-transitory computer-readable medium described above may further include processes, features, means, or instructions for determining not to transmit the DMRS in a second decoding candidate of the second set that may be frequency-aligned with the first decoding candidate, wherein demodulation of the second decoding candidate may be based on the DMRS transmitted in the first decoding candidate.

Some examples of the method, apparatus, and non-transitory computer-readable medium described above may further include processes, features, means, or instructions for transmitting, in the second control symbol period, a separate DMRS in a second decoding candidate of the second set of decoding candidates, wherein the DMRS transmitted during each of the first and second control symbol periods may have a same pattern.

Some examples of the method, apparatus, and non-transitory computer-readable medium described above may further include processes, features, means, or instructions for transmitting a first grant of resources for the UE in a control channel element of the first control symbol period corresponding to the first decoding candidate and a second grant of resources for the first UE in a control channel element of the second control symbol corresponding to the second decoding candidate.

In some examples of the method, apparatus, and non-transitory computer-readable medium described above, the first grant comprises an assignment of downlink resources for the UE and the second grant comprises an assignment of uplink resources for the UE.

In some examples of the method, apparatus, and non-transitory computer-readable medium described above, the first grant comprises an assignment of resources in the slot and the second grant comprises an assignment of resources in a subsequent slot.

Some examples of the method, apparatus, and non-transitory computer-readable medium described above may further include processes, features, means, or instructions for concatenating control channel elements with a first aggregation level in the first control symbol period corresponding to a first decoding candidate of the first second of decoding candidates and control channel elements with a second aggregation level in the second control symbol period corresponding to a second decoding candidate of the second set of decoding candidates to form a third decoding candidate with a third aggregation level, wherein the third aggregation level may be greater than the first aggregation level and the second aggregation level.

In some examples of the method, apparatus, and non-transitory computer-readable medium described above, the first aggregation level and the second aggregation level may be a same aggregation level.

In some examples of the method, apparatus, and non-transitory computer-readable medium described above, the third aggregation level comprises an integer multiple of the first aggregation level, the second aggregation level, or both.

In some examples of the method, apparatus, and non-transitory computer-readable medium described above, the third aggregation level comprises an aggregation level equivalent to a sum of the first aggregation level and the second aggregation level.

In some examples of the method, apparatus, and non-transitory computer-readable medium described above, the first decoding candidate and the second decoding candidate may be frequency aligned.

Some examples of the method, apparatus, and non-transitory computer-readable medium described above may further include processes, features, means, or instructions for determining that the control resource set for the UE may be less than a minimum bandwidth for the third aggregation level, wherein the first and second aggregation levels may be concatenated based on the determination.

Some examples of the method, apparatus, and non-transitory computer-readable medium described above may further include processes, features, means, or instructions for configuring the control resource set with a first set of control channel elements during the first control symbol period of the slot. Some examples of the method, apparatus, and non-transitory computer-readable medium described above may further include processes, features, means, or instructions for configuring the control resource set with a second set of control channel elements during the second control symbol period of the slot, wherein at least one boundary of the first set of control channel elements may be aligned in the frequency domain with at least one boundary of the second set of control channel elements.

Some examples of the method, apparatus, and non-transitory computer-readable medium described above may further include processes, features, means, or instructions for transmitting an indication of whether a DMRS may be present during the second control symbol period, wherein the configuration of the control resource set during the second control symbol period may be based on whether DMRS may be present during the second control symbol period.

Some examples of the method, apparatus, and non-transitory computer-readable medium described above may further include processes, features, means, or instructions for configuring the control resource set with a third set of control channel elements during the first control symbol period of a subsequent slot. Some examples of the method, apparatus, and non-transitory computer-readable medium described above may further include processes, features, means, or instructions for configuring the control resource set with a fourth set of control channel elements during a second control symbol period of the subsequent slot, wherein at least one boundary of the third set of control channel elements may be aligned in the frequency domain with at least one boundary of the fourth set of control channel elements. Some examples of the method, apparatus, and non-transitory computer-readable medium described above may further include processes, features, means, or instructions for transmitting control signaling in the subsequent slot for the UE in a control channel element corresponding to the one or more decoding candidates of the first set of decoding candidates, the one or more decoding candidates of the second set of decoding candidates, or both.

Some examples of the method, apparatus, and non-transitory computer-readable medium described above may further include processes, features, means, or instructions for transmitting an indication of whether beamforming or phase continuity, or both, may be maintained between the first control symbol period and the second control symbol period, wherein the configuration of the control resource set during the second control symbol period may be based on whether beamforming or phase continuity may be maintained.

A method of wireless communication is described. The method may include monitoring a first set of decoding candidates within a control resource set of the UE during a first control symbol period, monitoring a second set of decoding candidates within the control resource set during a second control symbol period, wherein a decoding candidate of the first set is aligned in the frequency domain with a decoding candidate of the second set, and communicating based on monitoring the first and second sets of decoding candidates.

An apparatus for wireless communication is described. The apparatus may include means for monitoring a first set of decoding candidates within a control resource set of the UE during a first control symbol period, means for monitoring a second set of decoding candidates within the control resource set during a second control symbol period, wherein a decoding candidate of the first set is aligned in the frequency domain with a decoding candidate of the second set, and means for communicating based on monitoring the first and second sets of decoding candidates.

Another apparatus for wireless communication is described. The apparatus may include a processor, memory in electronic communication with the processor, and instructions stored in the memory. The instructions may be operable to cause the processor to monitor a first set of decoding candidates within a control resource set of the UE during a first control symbol period, monitor a second set of decoding candidates within the control resource set during a second control symbol period, wherein a decoding candidate of the first set is aligned in the frequency domain with a decoding candidate of the second set, and communicate based on monitoring the first and second sets of decoding candidates.

A non-transitory computer readable medium for wireless communication is described. The non-transitory computer-readable medium may include instructions operable to cause a processor to monitor a first set of decoding candidates within a control resource set of the UE during a first control symbol period, monitor a second set of decoding candidates within the control resource set during a second control symbol period, wherein a decoding candidate of the first set is aligned in the frequency domain with a decoding candidate of the second set, and communicate based on monitoring the first and second sets of decoding candidates.

In some examples of the method, apparatus, and non-transitory computer-readable medium described above, the second set of decoding candidates comprises a repetition of an arrangement of the first set of decoding candidates such that decoding candidates in the second set may be frequency-aligned with decoding candidates in the first set.

In some examples of the method, apparatus, and non-transitory computer-readable medium described above, the first set of decoding candidates and the second set of decoding candidates occupy a same set of frequency resources.

In some examples of the method, apparatus, and non-transitory computer-readable medium described above, a set of control channel elements corresponding to the first set of decoding candidates and a set of control channel elements corresponding to the second set of decoding candidates each comprise a plurality of control channel element aggregation levels.

In some examples of the method, apparatus, and non-transitory computer-readable medium described above, a search space includes the first and second set of decoding candidates in the first and second control symbol periods, and wherein the first set of decoding candidates and the second set of decoding candidates each comprise a sub-search space of the search space.

In some examples of the method, apparatus, and non-transitory computer-readable medium described above, each of the sub-search spaces comprise a same set of PRBs.

Some examples of the method, apparatus, and non-transitory computer-readable medium described above may further include processes, features, means, or instructions for receiving a DMRS in a first decoding candidate of the first set during the first control symbol period.

Some examples of the method, apparatus, and non-transitory computer-readable medium described above may further include processes, features, means, or instructions for receiving the DMRS in a second decoding candidate of the second set during the second control symbol period, wherein the DMRS received in the first control symbol period may have a same pattern as the DMRS received in the second control symbol period.

Some examples of the method, apparatus, and non-transitory computer-readable medium described above may further include processes, features, means, or instructions for receiving a first grant of resources for the UE in the first decoding candidate and a second grant of resource for the UE in the second decoding candidate.

In some examples of the method, apparatus, and non-transitory computer-readable medium described above, the first grant comprises an assignment of downlink resources for the UE and the second grant comprises an assignment of uplink resources for the UE.

In some examples of the method, apparatus, and non-transitory computer-readable medium described above, the first grant comprises an assignment of resources in the slot and the second grant comprises an assignment of resources in a subsequent slot.

Some examples of the method, apparatus, and non-transitory computer-readable medium described above may further include processes, features, means, or instructions for receiving a first grant of resources for the UE in the first decoding candidate. Some examples of the method, apparatus, and non-transitory computer-readable medium described above may further include processes, features, means, or instructions for determining that the second decoding candidate may be empty.

Some examples of the method, apparatus, and non-transitory computer-readable medium described above may further include processes, features, means, or instructions for determining that control channel elements from a first aggregation level of a first decoding candidate of the first set and control channel elements from a second aggregation level of a second decoding candidate of the second set may be concatenated in a third aggregation level, wherein the third aggregation level may be greater than the first aggregation level and the second aggregation level.

In some examples of the method, apparatus, and non-transitory computer-readable medium described above, the first aggregation level and the second aggregation level may be a same aggregation level.

In some examples of the method, apparatus, and non-transitory computer-readable medium described above, the third aggregation level comprises an integer multiple of the first aggregation level, the second aggregation level, or both.

In some examples of the method, apparatus, and non-transitory computer-readable medium described above, the third aggregation level comprises an aggregation level equivalent to a sum of the first aggregation level and the second aggregation level.

In some examples of the method, apparatus, and non-transitory computer-readable medium described above, the control resource set may be less than a minimum bandwidth for the third aggregation level.

Some examples of the method, apparatus, and non-transitory computer-readable medium described above may further include processes, features, means, or instructions for determining whether a DMRS may be present during the second control symbol period, wherein monitoring the second set of decoding candidates may be based on whether DMRS may be present during the second control symbol period.

Some examples of the method, apparatus, and non-transitory computer-readable medium described above may further include processes, features, means, or instructions for performing a channel estimation for the second set of decoding candidates based on determining that the DMRS may be present during the second control symbol period.

Some examples of the method, apparatus, and non-transitory computer-readable medium described above may further include processes, features, means, or instructions for performing a channel estimation for the first set of decoding candidates. Some examples of the method, apparatus, and non-transitory computer-readable medium described above may further include processes, features, means, or instructions for applying the channel estimation during demodulation of the second set of decoding candidates based on determining that the DMRS may be not present during the second control symbol period.

Some examples of the method, apparatus, and non-transitory computer-readable medium described above may further include processes, features, means, or instructions for determining whether beamforming or phase continuity, or both, may be maintained between the first control symbol period and the second control symbol period, wherein monitoring the second set of decoding candidates may be based on whether beamforming or phase continuity may be maintained.

Some examples of the method, apparatus, and non-transitory computer-readable medium described above may further include processes, features, means, or instructions for performing joint channel estimation for the first set of decoding candidates and the second set of decoding candidates based on determining that beamforming or phase continuity, or both, may be maintained between the first control symbol period and the second control symbol period.

DETAILED DESCRIPTION

Figure 1:
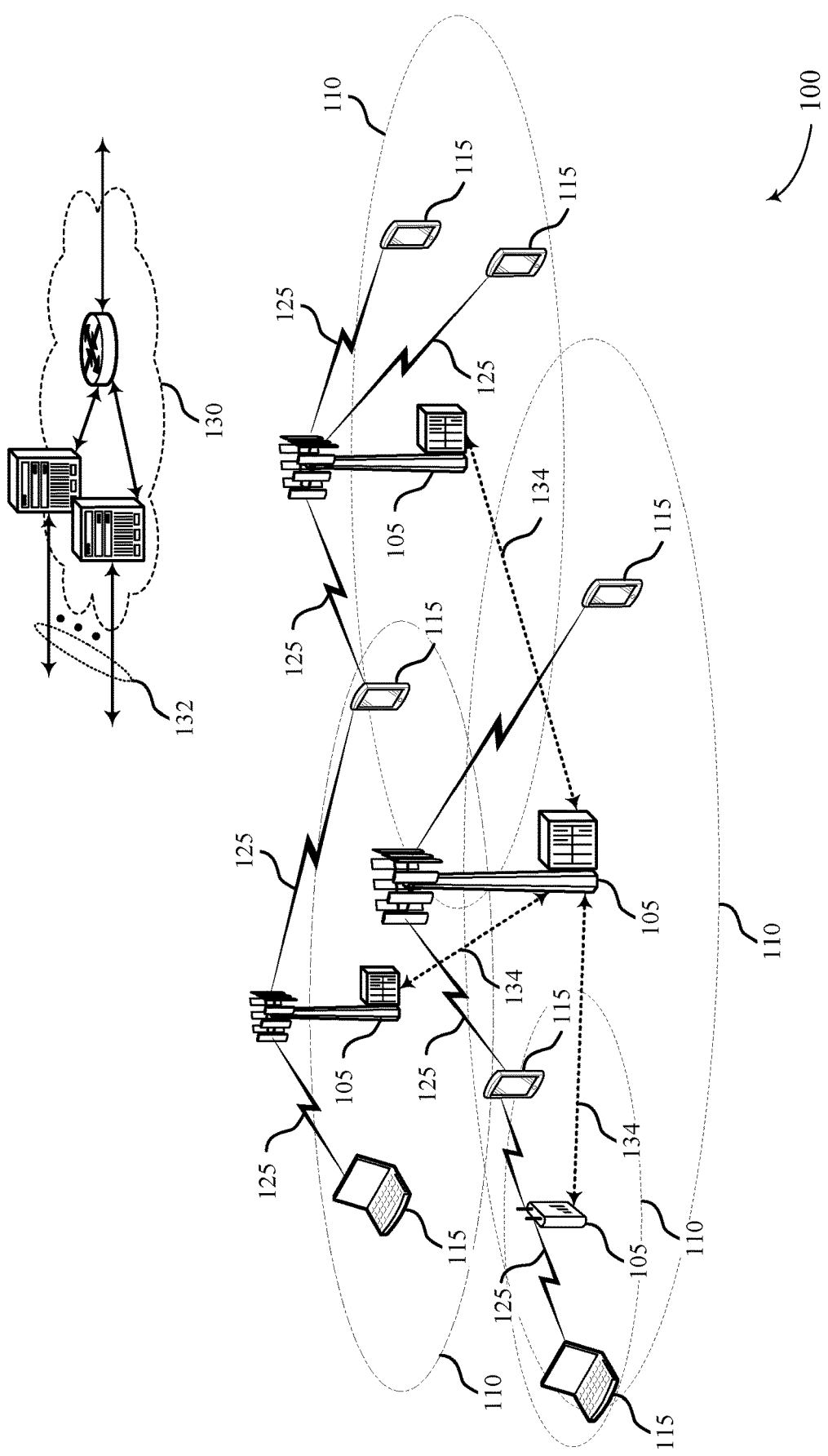
FIG. 1 illustrates an example of a system for wireless communication that supports a search space configuration and decoding in accordance with aspects of the present disclosure.

A set of physical resource blocks (PRBs) or resource element groups (REGs) may be configured over two or more modulation symbols. A control channel element (CCE), or fixed set of REGs, may be formed using REGs in one modulation symbol. A search space, or set of decoding candidates, may be configured for one user equipment (UE) or multiple UEs. Search spaces for different UEs may share some CCEs. A decoding candidate for a UE may occupy a set of CCEs; the UE may make decoding to attempts on the set of CCEs. A base station may transmit in a subset of decoding candidates configured for the UE. A demodulation reference signal (DMRS) may be transmitted when a decoding candidate is used, and DMRS may not be transmitted when a decoding candidate is not used.

In legacy LTE physical downlink control channel (PDCCH), a common search space (CSS) and a UE-specific search space (UESS) are defined for each UE, and each search space includes multiple decoding candidates for the UE to decode. During a conventional blind decode, a UE is informed of two or more possible aggregation level lengths for a control message in the PDCCH and attempts to decode multiple candidates corresponding to the two or more possible aggregation level lengths.

Conventional search space design may be problematic. A conventional search space includes decoding candidates that at least partially overlap with other decoding candidates. Overlap may refer to multiple decoding candidates that share at least one common channel element. When a base station transmits using a particular decoding candidate, the base station cannot use a shared CCE for other decoding candidates thereby blocking use of portions of a control channel. In some instances, blocking may significantly degrade control channel utilization. Also problematic is that conventional search space design includes decoding candidates that span multiple symbols in time. A UE thus has to wait until all symbols are received to complete decoding of such a decoding candidate.

In the examples described herein, a search space may have a structure that is divided into multiple sub-spaces and decoding candidates within each sub-space are frequency aligned at symbol boundaries. The UE may advantageously decode the decoding candidates in as few as a single symbol. Moreover, the search space may be intelligently constructed such that decoding candidates do not inefficiently overlap resulting in less blocking than in conventional solutions. Further, DMRS may only be transmitted in a first symbol of a search space that spans multiple symbols, and a UE may utilize a DMRS-based channel estimate in each search sub-space thereby reducing the number of times the UE performs channel estimation.

Aspects of the disclosure are initially described in the context of a wireless communications system. A search space having multiple sub-spaces is described. Aspects of the disclosure are further illustrated by and described with reference to apparatus diagrams, system diagrams, and flowcharts that relate to a search space for a decoder.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

A base station 105 may utilize a search space having a structure that is divided into multiple sub-spaces where divisions between the sub-spaces are aligned at symbol boundaries. Decoding candidates may be maintained in as few as a single symbol. Moreover, the search space may be intelligently constructed to reduce and/or eliminate overlap between common control elements in multiple decoding candidates.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In the examples described herein, a search space may have a structure that is divided into multiple sub-spaces and divisions between the sub-spaces are aligned at symbol boundaries. Decoding candidates may be maintained in as few as a single symbol. Moreover, the search space may be intelligently constructed to reduce and/or eliminate overlap between common control elements in multiple decoding candidates.

Figure 2:
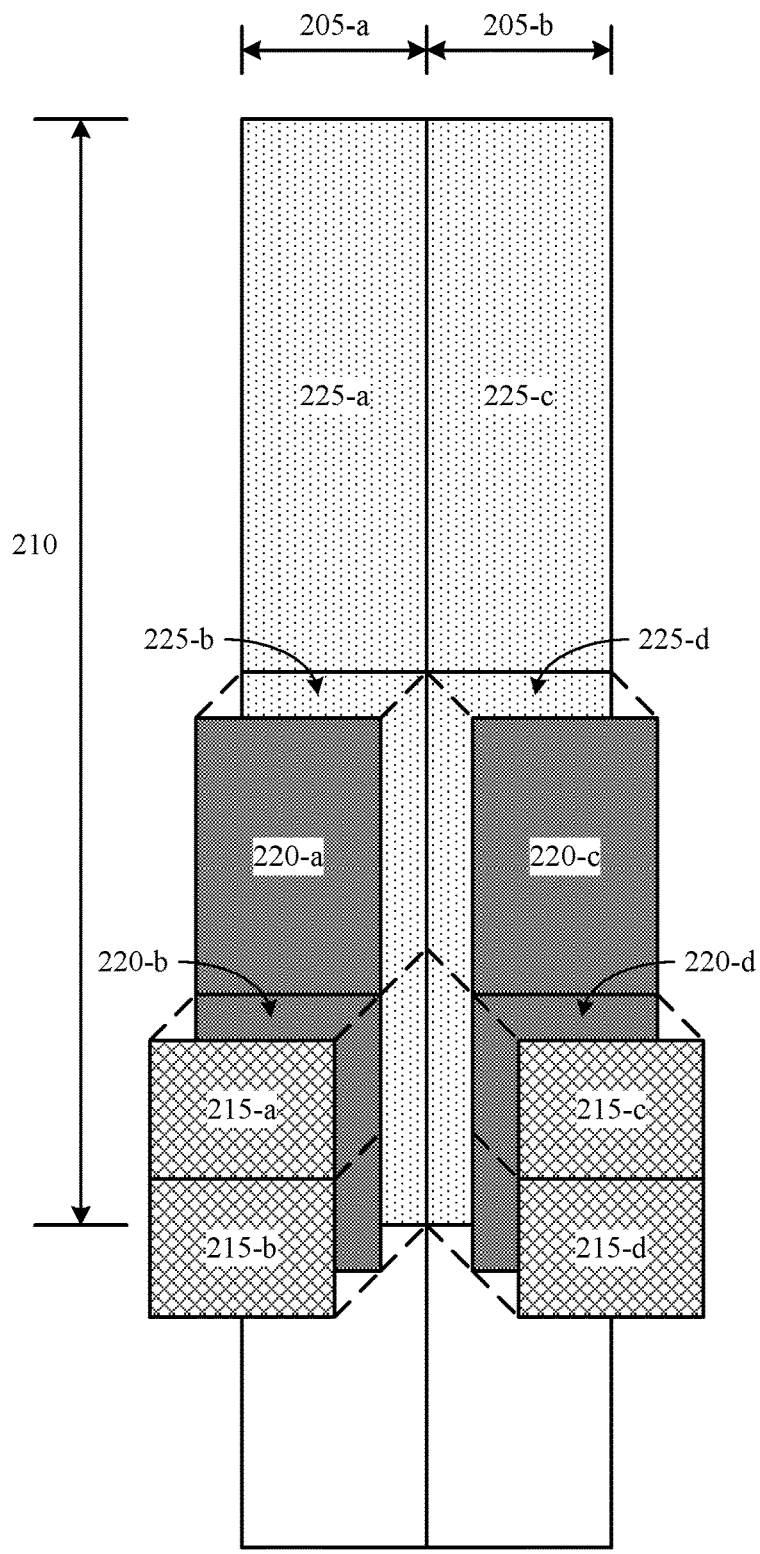
FIG. 2 illustrates an example diagram of a search space configuration in accordance with aspects of the present disclosure.

FIG. 2 illustrates an example diagram of a search space 200 that supports a search space for a decoder in accordance with various aspects of the present disclosure. In the depicted example, the search space 200 may correspond to time and frequency resources, and may be divided in two search sub-spaces 205-a, 205-b. A width of the search space 200 in time may correspond to a TTI and also may be referred to as a slot. While depicted as only having two search sub-spaces, the search space 200 may include two or more search sub-spaces. Each search sub-space 205 may be one control symbol wide in time. A base station 105 may transmit a single symbol for example, an OFDM symbol, within a symbol period correspond to each search sub-space 205.

The search space 200 may span a particular frequency range allocated to a control channel which may be divided into two or more control resource sets (coreset) 210. A coreset 210 may be a set of PRBs or REGs over which two control symbols are transmitted. A control symbol may be formed of one or more CCEs, and a CCE may be a fixed size set of PRBs or REGs. Each coreset 210 may be a portion of the control channel, and a base station 105 may allocate a coreset 210 to a single UE 115 or to a group of UEs 115. A base station 105 may inform a UE 115 which coreset it is to use. In an example, the base station 105 may encode a coreset identifier with an identifier of a UE 115 and the UE 115 may use its identifier to decode the coreset identifier.

The search space 200 may be compared of a set of decoding candidates that are configured for each UE (or common to multiple UEs). Across different UEs, search spaces may (partially) overlap (e.g., may share some CCEs). A base station 105 may inform the UE 115 of an arrangement of the decoding candidates (e.g., which CCEs correspond to which decoding candidate), select a set of one or more CCEs corresponding to one or more of the decoding candidates to use for transmission of a control message, and transmit the control message using the selected CCEs. A UE will attempt to decode the CCEs corresponding to the decoding candidates to receive the control message.

In some cases, the base station 105 may transmit information (e.g., in a master information block, in a system information block, or the like) to inform the UE 115 of a decoding candidate arrangement that it uses. The transmitted information may be sent on a per symbol basis, on a per slot basis, or the like, or may define the decoding candidate arrangement for multiple symbols, slots, or the like.

The decoding candidate structure may indicate which CCEs within a coreset 210 correspond to particular aggregation level (AL) decoding candidates. Each decoding candidate may correspond to a particular CCE or group of CCEs within the coreset 210. The CCEs of each symbol period of a slot may be aligned in frequency, and hence the decoding candidates of each symbol period may be aligned. An aggregation level is the number of CCEs in a control channel (e.g., PDCCH), and, in some instances, may be 1, 2, 4, or 8 consecutive CCEs. The decoding candidate arrangement may frequency align the decoding candidates in different symbols of two or more adjacent modulation symbols of search sub-spaces 205 in search space 200. In the depicted example, AL decoding candidates 215, 220, 225 within search sub-space 205-a may respectively be at the same frequencies as AL decoding candidates 215, 220, 225 within search sub-space 205-b. Further, the AL decoding candidates in the search sub-spaces 225-a, 225-b may occur within the same physical radio bearers.

A UE 115 may use the decoding candidate structure to identify where, and at which aggregation levels, within the search sub-space of its coreset 210 to performing decoding. In the depicted example, decoding candidates within coreset 210 of search sub-space 205-a may correspond to ALs having three different lengths (e.g., 1, 2, 4, 8, etc.), aggregation length one (AL1) 215-a, 215-b, aggregation length two (AL2) 220-a, 220-b, and aggregation length four (AL4) 225-a, 225-b. Each AL may correspond to particular CCEs of the coreset 210 within a symbol.

In an example, the base station 105 may configure a coreset 210, which may be a portion of a system bandwidth for a control channel, with a first set of control channel elements during a first modulation symbol period in search sub-space 205-a. The first set of control channel elements may correspond to a decoding candidate at a particular aggregation level within a search sub-space 205-a that corresponds to a first symbol period of the two symbol periods within search space 200. For example, the first set of control channel elements may correspond to any of AL decoding candidates 215-a, 215-b, 220-a, 220-b, 225-a, and 225-b of coreset 210. The base station 105 may configure a coreset 210 with a second set of control channel elements during a second modulation symbol period in search sub-space 205-b, wherein boundaries of the first set of control channel elements are aligned with boundaries of the second set of control channel elements in the frequency domain. For example, the second set of control channel elements may correspond to any of AL decoding candidates 215-c, 215-d, 220-c, 220-d, 225-c, and 225-d of coreset 210 within a search sub-space 205-b that corresponds to a second symbol period of the two symbol periods within search space 200.

As can be seen, the boundaries of the AL decoding candidates, and corresponding CCEs, in each of search sub-spaces 205-a, 205-b occupy the same frequency resources and hence are aligned with one another in the frequency domain. For example, AL decoding candidate 215-a of the first symbol period is frequency aligned with AL decoding candidate 215-c in the second symbol period. AL decoding candidate 215-b of the first symbol period is frequency aligned with AL decoding candidate 215-d in the second symbol period. AL decoding candidate 220-a of the first symbol period is frequency aligned with AL decoding candidate 220-c in the second symbol period. AL decoding candidate 220-b of the first symbol period is frequency aligned with AL decoding candidate 220-d in the second symbol period. AL decoding candidate 225-a of the first symbol period is frequency aligned with AL decoding candidate 225-c in the second symbol period. Lastly, AL decoding candidate 225-b of the first symbol period is frequency aligned with AL decoding candidate 215-d in the second symbol period. In some cases, the second set of decoding candidates includes a repetition of an arrangement of the first set decoding candidates. In some cases, the first set of decoding candidates and the second set of decoding candidates each include multiple control channel element aggregation levels. For example, one or more of the CCEs of AL decoding candidate 215-a are also included in one or more CCEs of AL decoding candidate 220-b.

In another example, base station 105 may allocate to the UE 115 decoding candidates at AL 220-a, 220-b for a grant in search sub-space 205-a, and decoding candidates AL 220-c, 220-d at the same frequencies for a grant in search sub-space 205-b. In some cases, a first grant may be included in a first decoding candidate of search sub-space 205-a that includes an assignment of downlink resources for the UE 115 and a second grant in search sub-space 205-b includes an assignment of uplink resources for the 115. In some cases, the grant in search sub-space 205-a includes an assignment of resources in a slot that includes the first and second modulation symbol periods corresponding to search space 200 and the grant in search sub-space 205-b includes an assignment of resources in a subsequent slot. In another example, base station 105 may allocate to the UE 115 decoding candidates at AL 215-a, 215-b for a downlink grant in search sub-space 205-*a*, and decoding candidates AL 215-*c*, 215-*d* at the same frequencies for a downlink grant in search sub-space 205-*b*.

If base station 105 only has a single grant for a UE 115, the base station 105 may allocate to the UE 115 decoding candidates for the single grant in a single search sub-space 205-*a*, and leave empty the corresponding decoding candidates in the next search sub-space 205-*b*. For example, a base station may transmit a single grant in decoding candidate 225-*a* of search sub-space 205-*a*, and may not transmit anything to the UE 115 in decoding candidate 225-*c* of search sub-space 205-*b* that is frequency aligned with decoding candidate 225-*a*. This may occur, for example, when a DMRS is beamformed to the UE 115. A channel estimate based on a beamformed DMRS may not be useable at a different time because the channel tends to change too much from symbol to symbol.

In another example, rather than leaving the decoding candidate location empty in the second control symbol period of a slot, the base station 105 may assign the decoding candidate to a different UE. For instance, CCEs of a first decoding candidate (e.g., AL decoding candidate 225-*a*) in a first control symbol period of a slot may include a first grant of resources for a first UE and CCEs of a second decoding candidate (e.g., AL decoding candidate 225-*c*) in search sub-space 205-*b* may include a second grant of resources for a second UE. These scenarios may be used, for example, if a commonly beamformed DMRS (e.g., between these two UEs) can be used to generate a channel estimate that is reliable for more than one symbol period. For example, a commonly beamformed DMRS may be used if not beamformed to an ideal direction of either UE.

During decoding, the UE 115 may perform channel estimation to generate a channel estimate using a DMRS corresponding to a particular search sub-space. The UE 115 may use the channel estimate to demodulate the particular search sub-space. For example, the UE 115 may use a channel estimate of a first control symbol period to decode CCEs corresponding to decoding candidates AL1 215-*a*, 215-*b*, AL2 220-*a*, 220-*b*, and AL4 225-*a*, 225-*b* of search sub-space 205-*a*. The UE 115 may sequentially proceed from AL decoding candidate to AL decoding candidate within search sub-space 205-*a* until all AL decoding candidates have been decoded. In another example, the UE 115 may decode two or more decoding candidates within search sub-space 205-*a* in parallel until all AL decoding candidates have been decoded. In further examples, the UE 115 may iteratively perform decoding on the UE 115 AL decoding candidates and stop when a first of the AL decoding candidates passes error detection (e.g., a cyclic redundancy check) or all when all have failed error detection.

In some instances, a DMRS may be a front loaded DMRS. A front loaded DMRS may refer to a DMRS being present in less than all symbol periods of the search sub-spaces. Advantageously, the UE may use a front loaded DMRS to generate a channel estimate for all of the search sub-spaces within a search space 200, and not just a first of the search sub-spaces. Moreover, such a channel estimate may be used in subsequent search sub-spaces even if DMRS is inserted in later symbols.

To enable use of a front loaded DMRS, a base station 105 may allocate the same frequency aligned AL decoding candidates in different search sub-spaces 205-*a*, 205-*b* to the same UE to enable that UE to use the front loaded DMRS-based channel estimate for each search sub-space. Because the frequency aligned AL decoding candidates occupy the same frequencies, but occur at a slightly different time, the UE 115 may use the channel estimate for demodulating each of the search sub-spaces 205-*a*, 205-*b*.

Configuration data may be exchanged to inform a UE of whether a channel estimate for one search sub-space is permitted to be used for demodulating a second search sub-space, as described below.

Figure 3:
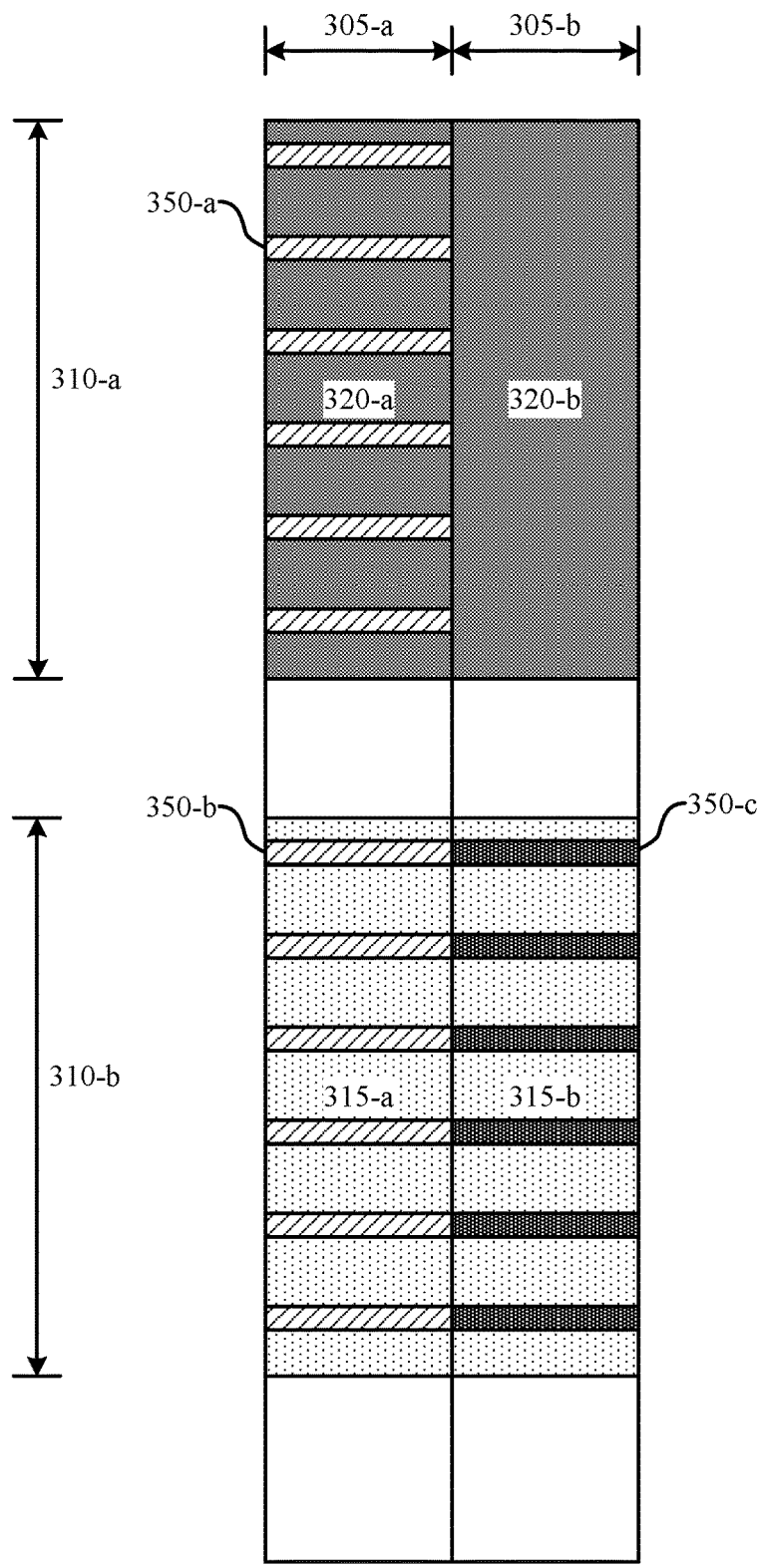
FIG. 3 illustrates an example diagram of DMRS in a search space configuration in accordance with aspects of the present disclosure.

FIG. 3 illustrates an example diagram 300 that supports a search space for a decoder in accordance with various aspects of the present disclosure. In the depicted example, search sub-spaces 305-*a*, 305-*b* are examples of search sub-spaces 205-*a*, 205-*b* of FIG. 2, and coreset 310 is an example of coreset 210 of FIG. 2.

In some examples, the base station 105 may signal configuration data to the UE 115 to indicate whether DMRS is included in one or more control symbol periods of a slot that correspond to different search sub-spaces. The configuration data may be sent, for example, on a slot by slot basis, or the configuration data may correspond to multiple slots. Further, different UEs with different configurations can coexist in a control channel but are allocated different coresets 310-*a*, 310-*b*. For example, a first UE 115 may be configured to operate within a first coreset 310-*a* and a second UE 115 may be configured to operate within a second coreset 310-*b*.

The configuration data may be an indicator to inform the UE 115 whether DMRS is present in a second (or subsequent) symbol period of a slot corresponding to the second search sub-space 305-*b*. Horizontal lines 350-*a*, 350-*b*, 350-*b* in FIG. 3 represent DMRS. If DMRS is included in each search sub-space 305-*a*, 305-*b*, the base station 105 may instruct the UE 115 to use the DMRS to perform a separate channel estimate in each search sub-space 305-*a*, 305-*b*.

For example, a base station 105 may allocate a coreset 310-*b* to a UE 115. In coreset 310-*b*, DMRS 350-*b* is present in search sub-space 305-*a*, and DMRS 350-*c* is present in search sub-space 305-*b*. When present in each, the UE 115 may perform a separate channel estimation in each search sub-space using the DMRS of that search sub-space, and derive a separate channel estimate from the DMRS 350 for each search sub-space 305-*a*, 305-*b* (e.g., use DMRS 350-*b* of search sub-space 305-*a* to generate a first channel estimate for first control symbol period, and use DMRS 350-*c* of search sub-space 305-*b* to generate a second channel estimate for second control symbol period). The UE 115 may use the first channel estimate as the channel estimate of the first search sub-space 305-*a* for demodulation of the first search sub-space 305-*a*. Likewise, the UE 115 may use the second channel estimate as the channel estimate of the second search sub-space 305-*b* for demodulation of the second search sub-space 305-*b*. In some cases, even if the DMRS is present in each search sub-space 305, the UE 115 may have the option to skip performing the second (or subsequent) channel estimation and instead use the channel estimate of the first search sub-space 405-*a* for demodulation of the second (or subsequent) search sub-space 305-*b*.

In some instances, DMRS may be included in less than all control symbol periods of a slot. For example, a base station 105 may allocate a coreset 310-*a* to a UE 115. In coreset 310-*a*, DMRS 350-*a* is present in a first control symbol period search of a slot (e.g., within sub-space 305-*a*), but no DMRS is in a second control symbol period of the slot (e.g., within sub-space 305-*b*). The UE 115 may perform channel estimation on the first control symbol period corresponding to search sub-space 305-*a* using the DMRS 350-*a* to generate a channel estimate, and may use the channel estimate for demodulating each of search sub-spaces 305-*a*, 305-*b*.

In some examples, the configuration data may inform the UE 115 if beamforming and phase continuity is maintained between the first control symbol period and the second control symbol period of a slot. If maintained, the UE 115 may perform joint channel estimation using a channel estimate of the first control symbol period corresponding to search sub-space 305-*a*, and a channel estimate of the second control symbol period corresponding to second search sub-space 305-*b*, to gain better channel estimation for decoding of the first and/or second search sub-spaces 305-*a*, 305-*b*.

In some instances, a bandwidth of a widest of the AL decoding candidates may be insufficient to meet a bandwidth requirement of CCEs to be transmitted. To overcome this issue, AL decoding candidates at the same frequencies in two or more search sub-spaces may be concatenated to form a larger decoding candidate, as described below.

Figure 4:
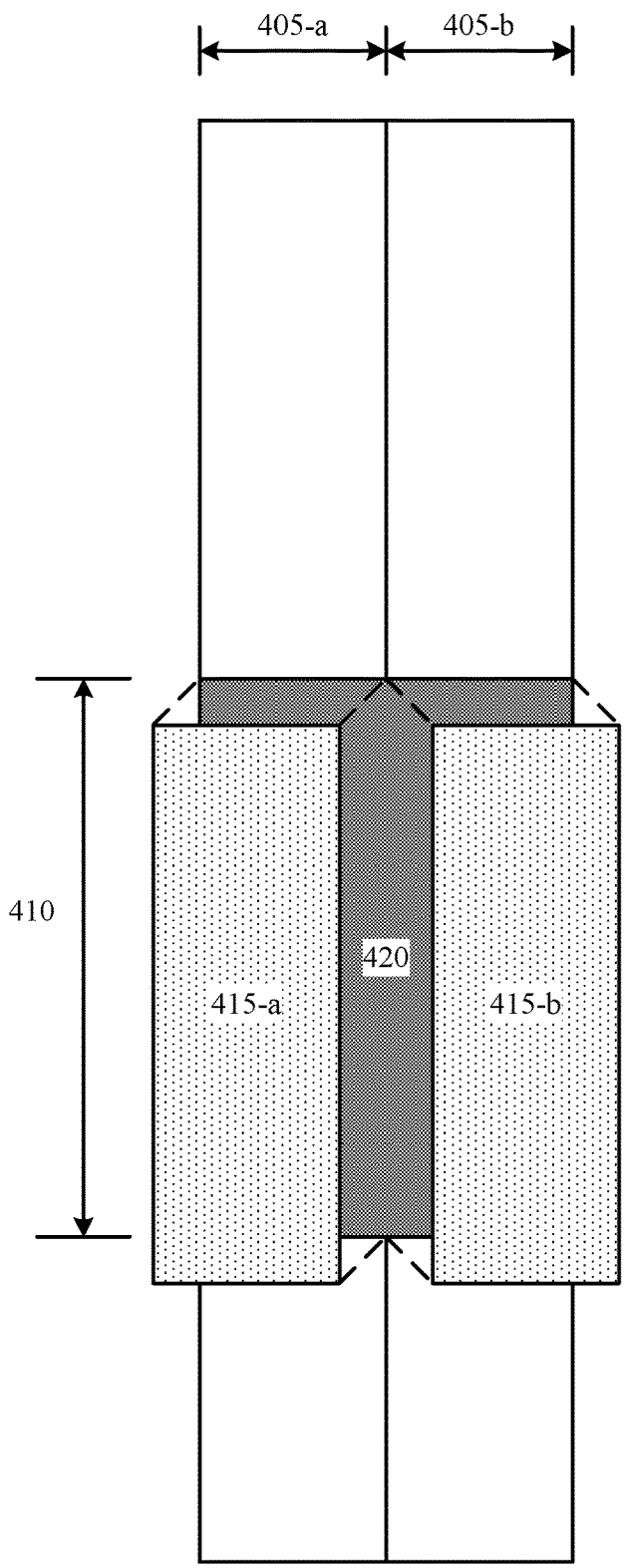
FIG. 4 illustrates an example of a concatenating decoding candidates in a search space configuration in accordance with aspects of the present disclosure.

FIG. 4 illustrates an example diagram 400 that supports a search space for a decoder in accordance with various aspects of the present disclosure. Search sub-spaces 405-*a*, 405-*b* are examples of search sub-spaces 205-*a*, 205-*b* of FIG. 2 and search sub-spaces 305-*a*, 305-*b* of FIG. 3, and coreset 410 is an example of coreset 210 of FIG. 2 and coreset 310 of FIG. 3. In this example, the bandwidth of AL4 is not wide enough to meet a bandwidth requirement for the number of CCEs to be transmitted. The base station 105 may determine how many AL decoding candidates to combine to meet the CCE bandwidth requirement, and may select a predetermined number (e.g., minimum number) of the AL decoding candidates to combine that meets the bandwidth requirement. In some examples, the AL decoding candidates may be of the same size. In other examples, the AL decoding candidates may be of different sizes.

In the depicted example, the CCE bandwidth requirement is two times the bandwidth of AL4. To meet the bandwidth requirement, the base station 105 may concatenate decoding candidates in multiple search sub-spaces that correspond to different control symbol periods of a slot. As depicted, base station 105 may allocate decoding candidate AL4 415-*a* in search sub-space 405-*a*, and decoding candidate AL4 415-*b* in search sub-space 405-*b* to the same UE 115. As can been seen, the decoding candidate AL4 415-*a*, 415-*a* occupy the same frequencies, but occur in different symbols in different search-subspaces 405-*a*, 405-*b* of a slot. In some examples, concatenating AL decoding candidates may be performed by aggregating CCEs over the same set of physical radio bearers across the different search sub-spaces.

In some examples, the base station 105 may concatenate CCEs corresponding to decoding candidates having different aggregation levels in different search sub-spaces. For example, with reference to FIG. 2, the base station 105 may concatenate CCEs of AL decoding candidate 215-*a* of search sub-space 205-*a* and AL decoding candidate 220-*d* of search sub-space 205-*b*. The AL decoding candidates corresponding to the concatenated CCEs may at least partially overlap in the different search sub-spaces of different symbol periods. In other examples, AL decoding candidates corresponding to the concatenated CCEs may not overlap in the different search sub-spaces of different symbol periods. The concatenated CCEs may also correspond to an integer number of the AL decoding candidates in each search sub-space (e.g., AL decoding candidate 215-*a* in search sub-space 205-*a* and AL decoding candidate 215-*c* in search sub-space 205-*b*). The concatenated CCEs may have an aggregation level that is equivalent to a sum of the aggregation levels of the decoding candidates being combined. For example, if each of decoding candidates 415-*a*, 415-*b* includes 8 CCEs, then the number of CCEs in the concatenated decoding candidate includes 16 CCEs. In some instances, the base station 105 may determine that the coreset 410 has a bandwidth that is less than a minimum bandwidth requirement for the number of CCEs to be transmitted, and may concatenate up to all of the CCEs in multiple symbol periods of the coreset 410. Beneficially, AL decoding candidates having smaller bandwidths may be used to efficiently utilize a communication channel, and AL decoding candidates may be combined on an as-needed basis to meet a bandwidth requirement that is wider than a widest of the AL decoding candidates.

In some instances, a search space may be a CSS or a UESS. A CSS may include control data that is common for multiple UEs, and hence multiple uses may search the CSS. A UESS may include control data for a particular UE. Beamforming techniques may also be used for communicating one or more UEs, including open-loop beamforming and closed-loop beamforming. Moreover, mapping of resource elements to CCEs may be performed in a number of different ways (e.g., frequency first, time first, etc.)

Search space configuration may vary in accordance with the type of beamforming used by a base station. In one example, a REG to CCE mapping rule may depend on a diversity mode. Depending on the search space type (e.g., CSS or UESS) and beamforming type (e.g., open-loop vs. closed-loop), the CCE to REG mapping can be differently defined. For open loop beamforming, a frequency first and time second structure may be used for sharing a CSS and a UESS. For closed-loop beamforming, a time-first/frequency-second structure may provide more localized RE mapping to better exploit closed-loop precoding gain.

In another example, a REG to CCE mapping rule may be bundled depending on whether front-loaded DMRS is being used. When base station (e.g., gNB) configures the search space of a UE with front-loaded RS, a REG to CCE mapping may use time first. Conversely, when a gNB configures the search space of a UE to uses RS every control symbol REG to CCE mapping uses frequency first.

The examples described herein provide a number of benefits. For example, a base station 105 may be able to combine AL decoding candidates across multiple search sub-spaces to meet bandwidth requirements on an as-needed basis. AL decoding candidates having smaller bandwidth may be typically used to maintain a high rate of channel utilization. When a the bandwidth requirement exceeds the bandwidth of a largest of the AL decoding candidates, the base station 105 may combine AL decoding candidates within the same frequency resources in multiple search sub-spaces. Additionally or alternatively, decoding candidates may beneficially have a common arrangement in different symbol periods within a slot, permitting front-loaded channel estimation.

Figure 5:
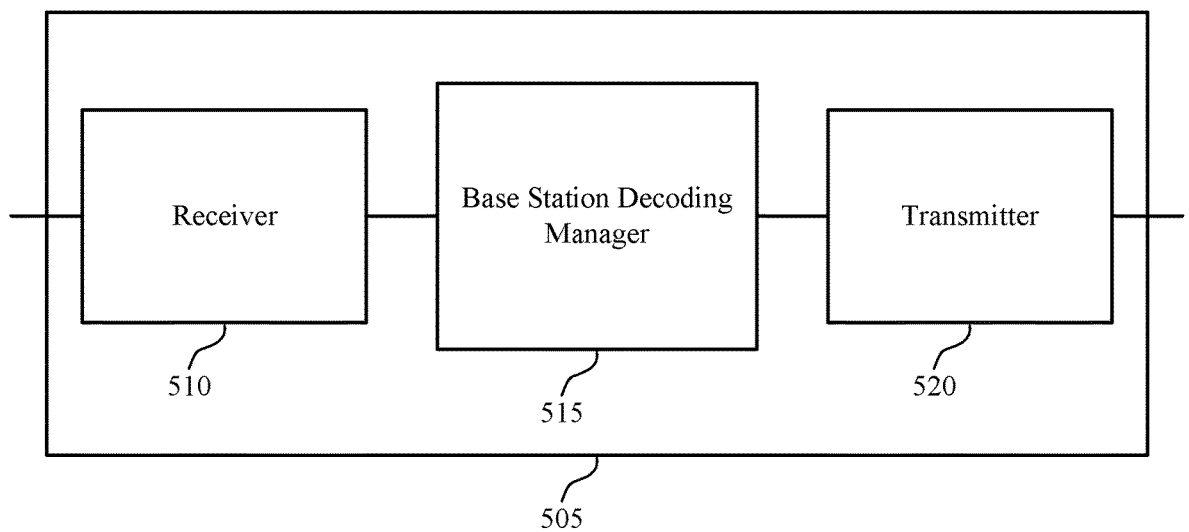
FIGS. 5 through 7 show block diagrams of a device that supports a search space configuration and decoding accordance with aspects of the present disclosure.

FIG. 5 shows a block diagram 500 of a wireless device 505 that supports search space for a decoder in accordance with various aspects of the present disclosure. Wireless device 505 may be an example of aspects of a base station 105 as described with reference to FIG. 1. wireless device 505 may include receiver 510, base station decoding manager 515, and transmitter 520. wireless device 505 may also include a processor. Each of these components may be in communication with one another (e.g., via one or more buses).

Receiver 510 may receive information such as packets, user data, or control information associated with various information channels (e.g., control channels, data channels, and information related to search space for a decoder, etc.).

Information may be passed on to other components of the device. The receiver 510 may be an example of aspects of the transceiver 835 described with reference to FIG. 8.

Base station decoding manager 515 may be an example of aspects of the base station decoding manager 815 described with reference to FIG. 8.

Base station decoding manager 515 and/or at least some of its various sub-components may be implemented in hardware, software executed by a processor, firmware, or any combination thereof. If implemented in software executed by a processor, the functions of the base station decoding manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station decoding manager 515 and/or at least some of its various sub-components may be physically located at various positions, including being distributed such that portions of functions are implemented at different physical locations by one or more physical devices. In some examples, base station decoding manager 515 and/or at least some of its various sub-components may be a separate and distinct component in accordance with various aspects of the present disclosure. In other examples, base station decoding manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station decoding manager 515 may configure a UE to monitor a first set of decoding candidates in a first control symbol period of a slot, where each decoding candidate in the first set corresponds to at least one control channel element in the first control symbol period, configure the UE to monitor a second set of decoding candidates in the second control symbol period of the slot, where each decoding candidate in the second set corresponds to at least one control channel element in the second control symbol period, and where a decoding candidate in the second set is aligned in the frequency domain with a decoding candidate in the first set, and transmit control signaling within a control resource set for the UE in the slot in a control channel element corresponding to one or more decoding candidates of the first set of decoding candidates, one or more decoding candidates of the second set of decoding candidates, or both.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
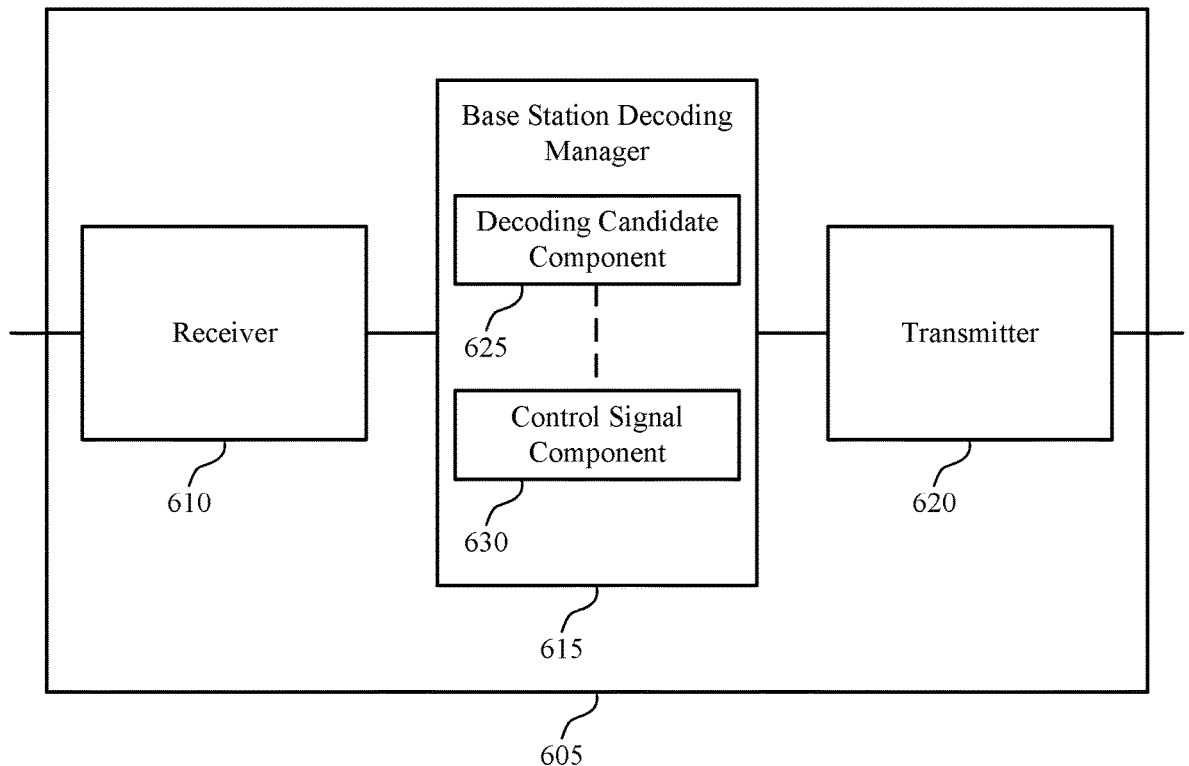

FIG. 6 shows a block diagram 600 of a wireless device 605 that supports search space for a decoder in accordance with various aspects of the present disclosure. Wireless device 605 may be an example of aspects of a wireless device 505 or a base station 105 as described with reference to FIGS. 1 and 5. wireless device 605 may include receiver 610, base station decoding manager 615, and transmitter 620. wireless device 605 may also include a processor. Each of these components may be in communication with one another (e.g., via one or more buses).

Receiver 610 may receive information such as packets, user data, or control information associated with various information channels (e.g., control channels, data channels, and information related to search space for a decoder, etc.). Information may be passed on to other components of the device. The receiver 610 may be an example of aspects of the transceiver 835 described with reference to FIG. 8.

Base station decoding manager 615 may be an example of aspects of the base station decoding manager 815 described with reference to FIG. 8.

Base station decoding manager 615 may also include decoding candidate component 625 and control signal component 630.

Decoding candidate component 625 may configure a UE to monitor a first set of decoding candidates in a first control symbol period of a slot, where each decoding candidate in the first set corresponds to at least one control channel element in the first control symbol period and configure the UE to monitor a second set of decoding candidates in the second control symbol period of the slot, where each decoding candidate in the second set corresponds to at least one control channel element in the second control symbol period, and where a decoding candidate in the second set is aligned in the frequency domain with a decoding candidate in the first set. In some cases, the second set of decoding candidates includes a repetition of an arrangement of the first set of decoding candidates such that decoding candidates for the UE in the second set are frequency-aligned with decoding candidates in the first set. In some cases, the decoding candidates are defined by one or more aggregation levels in a search space including a first set of control channel elements in the first control symbol period and a second set of control channel elements in the second control symbol period. In some cases, the search space includes the control resource set and the first and second control symbol periods, and where the first set of control channel elements and the second set of control channel elements each include a sub-search space of the search space. In some cases, each of the sub-search spaces include a same set of physical resource blocks (resource block (RB)s). In some cases, the first set of decoding candidates and the second set of decoding candidates occupy a same set of frequency resources. In some cases, the first set of decoding candidates and the second set of decoding candidates each include a set of control channel element aggregation levels. In some cases, the first and second set of decoding candidates in the first and second control symbol periods include a search space, and where the first set of decoding candidates and the second set of decoding candidates each include a sub-search space of the search space. In some cases, each of the sub-search spaces include a same set of PRBs.

Control signal component 630 may transmit control signaling within a control resource set for the UE in the slot in a control channel element corresponding to one or more decoding candidates of the first set of decoding candidates, one or more decoding candidates of the second set of decoding candidates, or both and transmit control signaling in the subsequent slot for the UE in a control channel element corresponding to the one or more decoding candidates of the first set of decoding candidates, the one or more decoding candidates of the second set of decoding candidates, or both.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
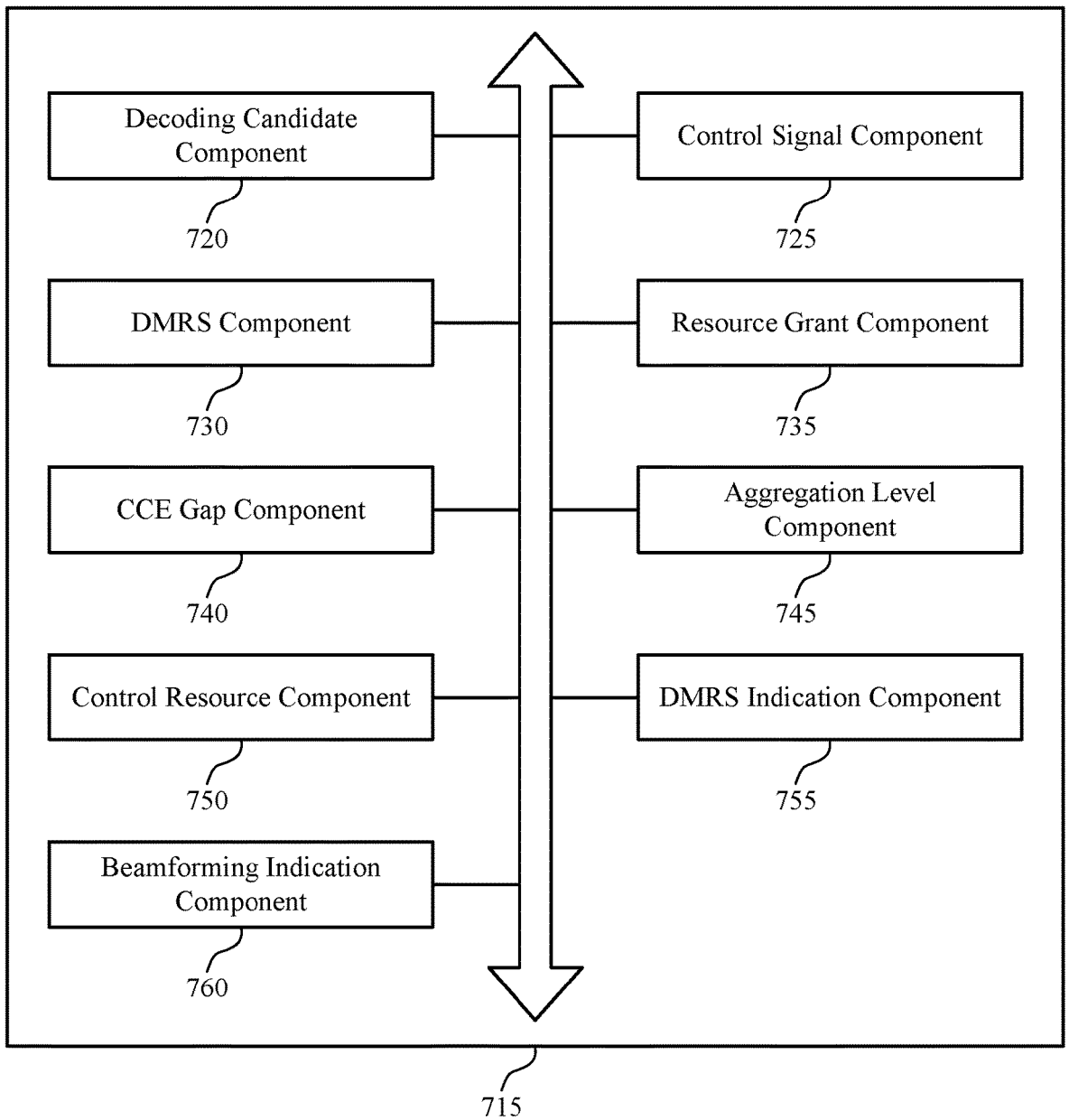

FIG. 7 shows a block diagram 700 of a base station decoding manager 715 that supports search space for a decoder in accordance with various aspects of the present disclosure. The base station decoding manager 715 may be an example of aspects of a base station decoding manager 515, a base station decoding manager 615, or a base station decoding manager 815 described with reference to FIGS. 5, 6, and 8. The base station decoding manager 715 may include decoding candidate component 720, control signal component 725, DMRS component 730, resource grant component 735, CCE gap component 740, aggregation level component 745, control resource component 750, DMRS indication component 755, and beamforming indication component 760. Each of these modules may communicate, directly or indirectly, with one another (e.g., via one or more buses).

Decoding candidate component 720 may configure a UE to monitor a first set of decoding candidates in a first control symbol period of a slot, where each decoding candidate in the first set corresponds to at least one control channel element in the first control symbol period and configure the UE to monitor a second set of decoding candidates in the second control symbol period of the slot, where each decoding candidate in the second set corresponds to at least one control channel element in the second control symbol period, and where a decoding candidate in the second set is aligned in the frequency domain with a decoding candidate in the first set. In some cases, the second set of decoding candidates includes a repetition of an arrangement of the first set of decoding candidates such that decoding candidates for the UE in the second set are frequency-aligned with decoding candidates in the first set. In some cases, the decoding candidates are defined by one or more aggregation levels in a search space including a first set of control channel elements in the first control symbol period and a second set of control channel elements in the second control symbol period. In some cases, the search space includes the control resource set and the first and second control symbol periods, and where the first set of control channel elements and the second set of control channel elements each include a sub-search space of the search space. In some cases, each of the sub-search spaces include a same set of PRBs. In some cases, the first set of decoding candidates and the second set of decoding candidates occupy a same set of frequency resources. In some cases, the first set of decoding candidates and the second set of decoding candidates each include a set of control channel element aggregation levels. In some cases, the first and second set of decoding candidates in the first and second control symbol periods include a search space, and where the first set of decoding candidates and the second set of decoding candidates each include a sub-search space of the search space. In some cases, each of the sub-search spaces include a same set of PRBs.

Control signal component 725 may transmit control signaling within a control resource set for the UE in the slot in a control channel element corresponding to one or more decoding candidates of the first set of decoding candidates, one or more decoding candidates of the second set of decoding candidates, or both and transmit control signaling in the subsequent slot for the UE in a control channel element corresponding to the one or more decoding candidates of the first set of decoding candidates, the one or more decoding candidates of the second set of decoding candidates, or both.

DMRS component 730 may transmit a DMRS in a first decoding candidate of the first set of decoding candidates during the first control symbol period, determine not to transmit the DMRS in a second decoding candidate of the second set that is frequency-aligned with the first decoding candidate, where demodulation of the second decoding candidate is based on the DMRS transmitted in the first decoding candidate, and transmit, in the second control symbol period, a separate DMRS in a second decoding candidate of the second set of decoding candidates, where the DMRS transmitted during each of the first and second control symbol periods has a same pattern. In some cases, the DMRS transmitted in a first decoding candidate of the first set aids in decoding a second decoding candidate of the second set of decoding candidates that is frequency-aligned with the first decoding candidate.

Resource grant component 735 may transmit a grant of resources for the UE in a control channel element of the first control symbol period corresponding to the first decoding candidate and transmit a first grant of resources for the UE in a control channel element of the first control symbol period corresponding to the first decoding candidate and a second grant of resources for the first UE in a control channel element of the second control symbol corresponding to the second decoding candidate. In some cases, the first grant includes an assignment of downlink resources for the UE and the second grant includes an assignment of uplink resources for the UE. In some cases, the first grant includes an assignment of resources in the slot and the second grant includes an assignment of resources in a subsequent slot.

CCE gap component 740 may determine to leave empty a control channel element of the second control symbol period corresponding to the second decoding candidate.

Aggregation level component 745 may concatenate control channel elements with a first aggregation level in the first control symbol period corresponding to a first decoding candidate of the first second of decoding candidates and control channel elements with a second aggregation level in the second control symbol period corresponding to a second decoding candidate of the second set of decoding candidates to form a third decoding candidate with a third aggregation level, where the third aggregation level is greater than the first aggregation level and the second aggregation level and determine that the control resource set for the UE is less than a minimum bandwidth for the third aggregation level, where the first and second aggregation levels are concatenated based on the determination. In some cases, the first aggregation level and the second aggregation level are a same aggregation level. In some cases, the third aggregation level includes an integer multiple of the first aggregation level, the second aggregation level, or both. In some cases, the third aggregation level includes an aggregation level equivalent to a sum of the first aggregation level and the second aggregation level. In some cases, the first decoding candidate and the second decoding candidate are frequency aligned.

Control resource component 750 may configure the control resource set with a first set of control channel elements during the first control symbol period of the slot, configure the control resource set with a second set of control channel elements during the second control symbol period of the slot, where at least one boundary of the first set of control channel elements is aligned in the frequency domain with at least one boundary of the second set of control channel elements, configure the control resource set with a third set of control channel elements during the first control symbol period of a subsequent slot, and configure the control resource set with a fourth set of control channel elements during a second control symbol period of the subsequent slot, where at least one boundary of the third set of control channel elements is aligned in the frequency domain with at least one boundary of the fourth set of control channel elements.

DMRS indication component 755 may transmit an indication of whether a DMRS is present during the second control symbol period, where the configuration of the control resource set during the second control symbol period is based on whether DMRS is present during the second control symbol period.

Beamforming indication component 760 may transmit an indication of whether beamforming or phase continuity, or both, are maintained between the first control symbol period and the second control symbol period, where the configuration of the control resource set during the second control symbol period is based on whether beamforming or phase continuity is maintained.

Figure 8:
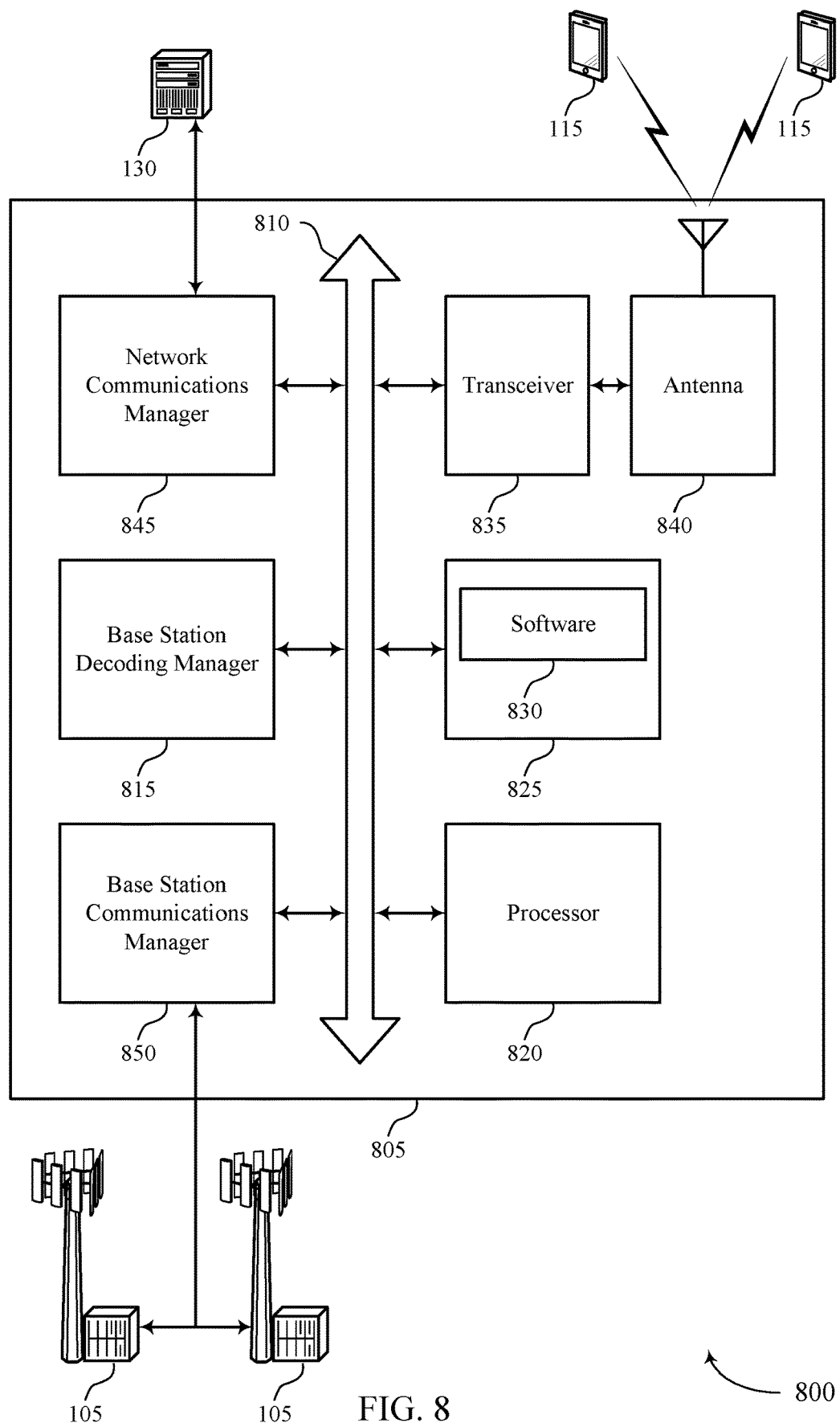
FIG. 8 illustrates a block diagram of a system including a base station that supports a search space configuration and decoding in accordance with aspects of the present disclosure.

FIG. 8 shows a diagram of a system 800 including a device 805 that supports search space for a decoder in accordance with various aspects of the present disclosure. Device 805 may be an example of or include the components of wireless device 505, wireless device 605, or a base station 105 as described above, e.g., with reference to FIGS. 1, 5 and 6. Device 805 may include components for bi-directional voice and data communications including components for transmitting and receiving communications, including base station decoding manager 815, processor 820, memory 825, software 830, transceiver 835, antenna 840, network communications manager 845, and base station communications manager 850. These components may be in electronic communication via one or more busses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting search space for a decoder).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support search space for a decoder. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Base station communications manager 850 may manage communications with other base station 105, and may include a controller or scheduler for controlling communications with UEs 115 in cooperation with other base stations 105. For example, the base station communications manager 850 may coordinate scheduling for transmissions to UEs 115 for various interference mitigation techniques such as beamforming or joint transmission. In some examples, base station communications manager 850 may provide an X2 interface within an LTE/LTE-A wireless communication network technology to provide communication between base stations 105.

Figure 9:
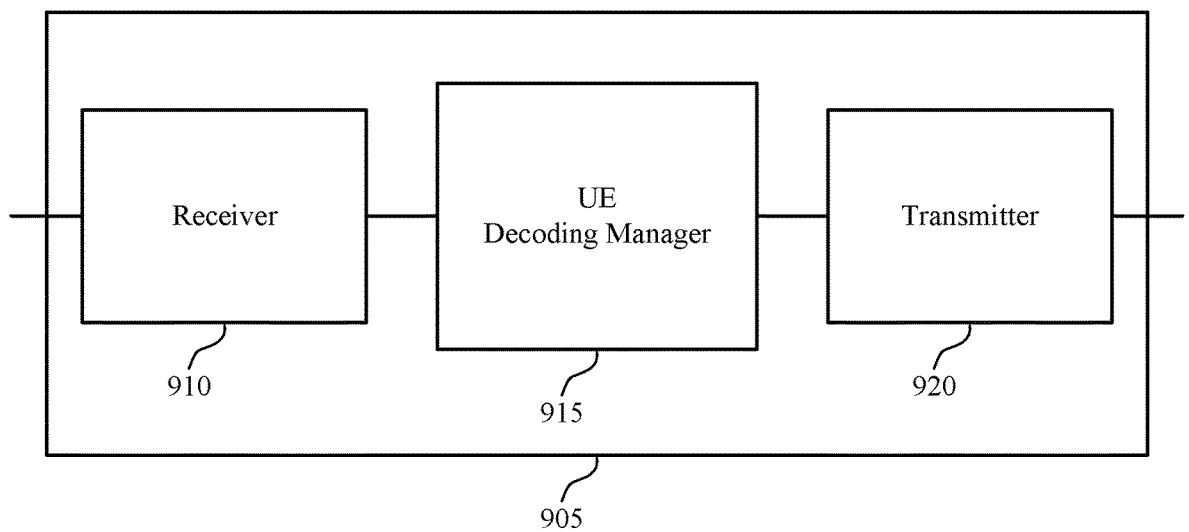
FIGS. 9 through 11 show block diagrams of a device that supports a search space configuration and decoding in accordance with aspects of the present disclosure.

FIG. 9 shows a block diagram 900 of a wireless device 905 that supports search space for a decoder in accordance with various aspects of the present disclosure. Wireless device 905 may be an example of aspects of a UE 115 as described with reference to FIG. 1. wireless device 905 may include receiver 910, UE decoding manager 915, and transmitter 920. wireless device 905 may also include a processor. Each of these components may be in communication with one another (e.g., via one or more buses).

Receiver 910 may receive information such as packets, user data, or control information associated with various information channels (e.g., control channels, data channels, and information related to search space for a decoder, etc.). Information may be passed on to other components of the device. The receiver 910 may be an example of aspects of the transceiver 1235 described with reference to FIG. 12.

UE decoding manager 915 may be an example of aspects of the UE decoding manager 1215 described with reference to FIG. 12.

UE decoding manager 915 and/or at least some of its various sub-components may be implemented in hardware, software executed by a processor, firmware, or any combination thereof. If implemented in software executed by a processor, the functions of the UE decoding manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE decoding manager 915 and/or at least some of its various sub-components may be physically located at various positions, including being distributed such that portions of functions are implemented at different physical locations by one or more physical devices. In some examples, UE decoding manager 915 and/or at least some of its various sub-components may be a separate and distinct component in accordance with various aspects of the present disclosure. In other examples, UE decoding manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE decoding manager 915 may monitor a first set of decoding candidates within a control resource set of the UE during a first control symbol period, monitor a second set of decoding candidates within the control resource set during a second control symbol period, where a decoding candidate of the first set is aligned in the frequency domain with a decoding candidate of the second set, and communicate based on monitoring the first and second sets of decoding candidates.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
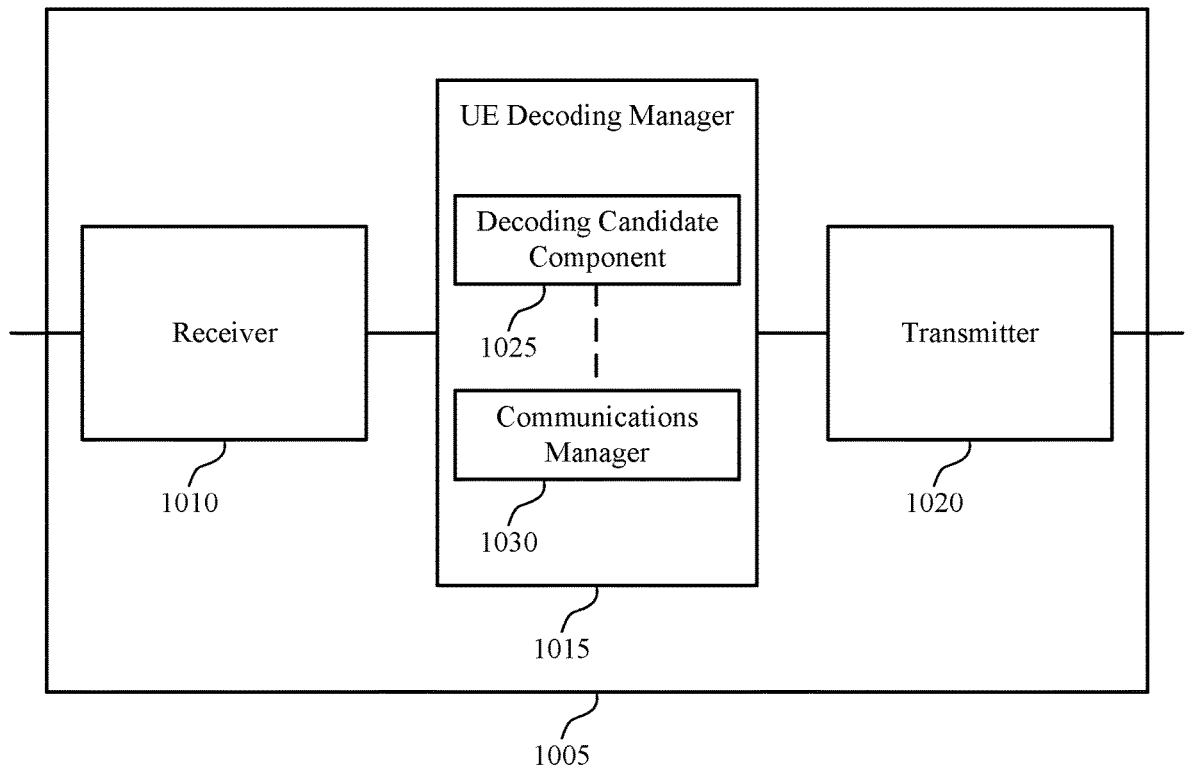

FIG. 10 shows a block diagram 1000 of a wireless device 1005 that supports search space for a decoder in accordance with various aspects of the present disclosure. Wireless device 1005 may be an example of aspects of a wireless device 905 or a UE 115 as described with reference to FIGS. 1 and 9. wireless device 1005 may include receiver 1010, UE decoding manager 1015, and transmitter 1020. wireless device 1005 may also include a processor. Each of these components may be in communication with one another (e.g., via one or more buses).

Receiver 1010 may receive information such as packets, user data, or control information associated with various information channels (e.g., control channels, data channels, and information related to search space for a decoder, etc.). Information may be passed on to other components of the device. The receiver 1010 may be an example of aspects of the transceiver 1235 described with reference to FIG. 12.

UE decoding manager 1015 may be an example of aspects of the UE decoding manager 1215 described with reference to FIG. 12. UE decoding manager 1015 may also include decoding candidate component 1025 and communications manager 1030.

Decoding candidate component 1025 may monitor a first set of decoding candidates within a control resource set of the UE during a first control symbol period and monitor a second set of decoding candidates within the control resource set during a second control symbol period, where a decoding candidate of the first set is aligned in the frequency domain with a decoding candidate of the second set. In some cases, the second set of decoding candidates includes a repetition of an arrangement of the first set of decoding candidates such that decoding candidates in the second set are frequency-aligned with decoding candidates in the first set. In some cases, the first set of decoding candidates and the second set of decoding candidates occupy a same set of frequency resources. In some cases, a set of control channel elements corresponding to the first set of decoding candidates and a set of control channel elements corresponding to the second set of decoding candidates each include a set of control channel element aggregation levels. In some cases, a search space includes the first and second set of decoding candidates in the first and second control symbol periods, and where the first set of decoding candidates and the second set of decoding candidates each include a sub-search space of the search space. In some cases, each of the sub-search spaces include a same set of PRBs.

Communications manager 1030 may communicate based on monitoring the first and second sets of decoding candidates.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
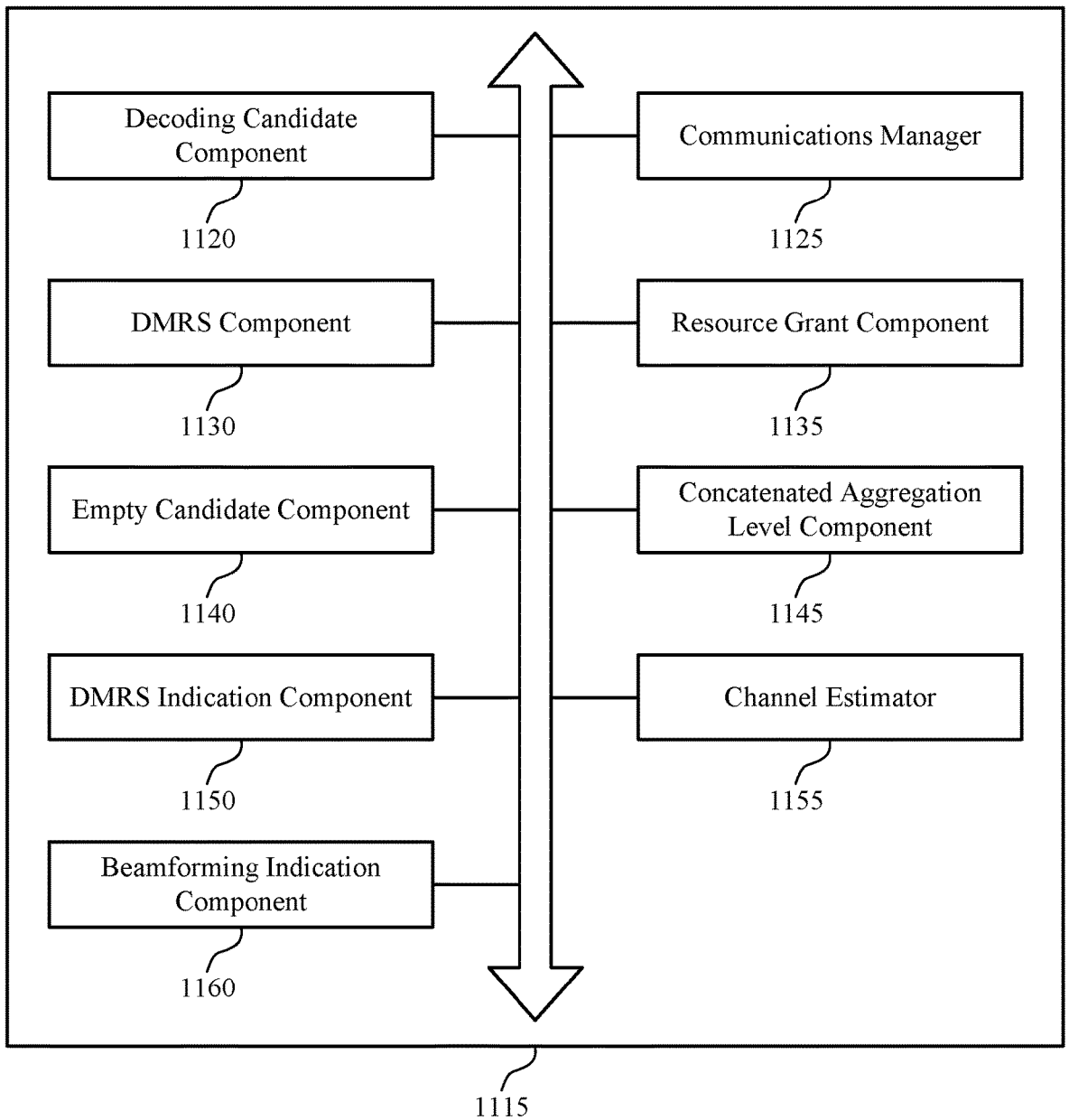

FIG. 11 shows a block diagram 1100 of a UE decoding manager 1115 that supports search space for a decoder in accordance with various aspects of the present disclosure. The UE decoding manager 1115 may be an example of aspects of a UE decoding manager 1215 described with reference to FIGS. 9, 10, and 12. The UE decoding manager 1115 may include decoding candidate component 1120, communications manager 1125, DMRS component 1130, resource grant component 1135, empty candidate component 1140, concatenated aggregation level component 1145, DMRS indication component 1150, channel estimator 1155, and beamforming indication component 1160. Each of these modules may communicate, directly or indirectly, with one another (e.g., via one or more buses).

Decoding candidate component 1120 may monitor a first set of decoding candidates within a control resource set of the UE during a first control symbol period and monitor a second set of decoding candidates within the control resource set during a second control symbol period, where a decoding candidate of the first set is aligned in the frequency domain with a decoding candidate of the second set. In some cases, the second set of decoding candidates includes a repetition of an arrangement of the first set of decoding candidates such that decoding candidates in the second set are frequency-aligned with decoding candidates in the first set. In some cases, the first set of decoding candidates and the second set of decoding candidates occupy a same set of frequency resources. In some cases, a set of control channel elements corresponding to the first set of decoding candidates and a set of control channel elements corresponding to the second set of decoding candidates each include a set of control channel element aggregation levels. In some cases, a search space includes the first and second set of decoding candidates in the first and second control symbol periods, and where the first set of decoding candidates and the second set of decoding candidates each include a sub-search space of the search space. In some cases, each of the sub-search spaces include a same set of PRBs.

Communications manager 1125 may communicate based on monitoring the first and second sets of decoding candidates.

DMRS component 1130 may receive a DMRS in a first decoding candidate of the first set during the first control symbol period and receive the DMRS in a second decoding candidate of the second set during the second control symbol period, where the DMRS received in the first control symbol period has a same pattern as the DMRS received in the second control symbol period.

Resource grant component 1135 may receive a first grant of resources for the UE in the first decoding candidate and a second grant of resource for the UE in the second decoding candidate and receive a first grant of resources for the UE in the first decoding candidate. In some cases, the first grant includes an assignment of downlink resources for the UE and the second grant includes an assignment of uplink resources for the UE. In some cases, the first grant includes an assignment of resources in the slot and the second grant includes an assignment of resources in a subsequent slot.

Empty candidate component 1140 may determine that the second decoding candidate is empty.

Concatenated aggregation level component 1145 may determine that control channel elements from a first aggregation level of a first decoding candidate of the first set and control channel elements from a second aggregation level of a second decoding candidate of the second set are concatenated in a third aggregation level, where the third aggregation level is greater than the first aggregation level and the second aggregation level. In some cases, the first aggregation level and the second aggregation level are a same aggregation level. In some cases, the third aggregation level includes an integer multiple of the first aggregation level, the second aggregation level, or both. In some cases, the third aggregation level includes an aggregation level equivalent to a sum of the first aggregation level and the second aggregation level. In some cases, the control resource set is less than a minimum bandwidth for the third aggregation level.

DMRS indication component 1150 may determine whether a DMRS is present during the second control symbol period, where monitoring the second set of decoding candidates is based on whether DMRS is present during the second control symbol period.

Channel estimator 1155 may perform a channel estimation for the second set of decoding candidates based on determining that the DMRS is present during the second control symbol period, perform a channel estimation for the first set of decoding candidates, apply the channel estimation during demodulation of the second set of decoding candidates based on determining that the DMRS is not present during the second control symbol period, and perform joint channel estimation for the first set of decoding candidates and the second set of decoding candidates based on determining that beamforming or phase continuity, or both, are maintained between the first control symbol period and the second control symbol period.

Beamforming indication component 1160 may determine whether beamforming or phase continuity, or both, are maintained between the first control symbol period and the second control symbol period, where monitoring the second set of decoding candidates is based on whether beamforming or phase continuity is maintained.

Figure 12:
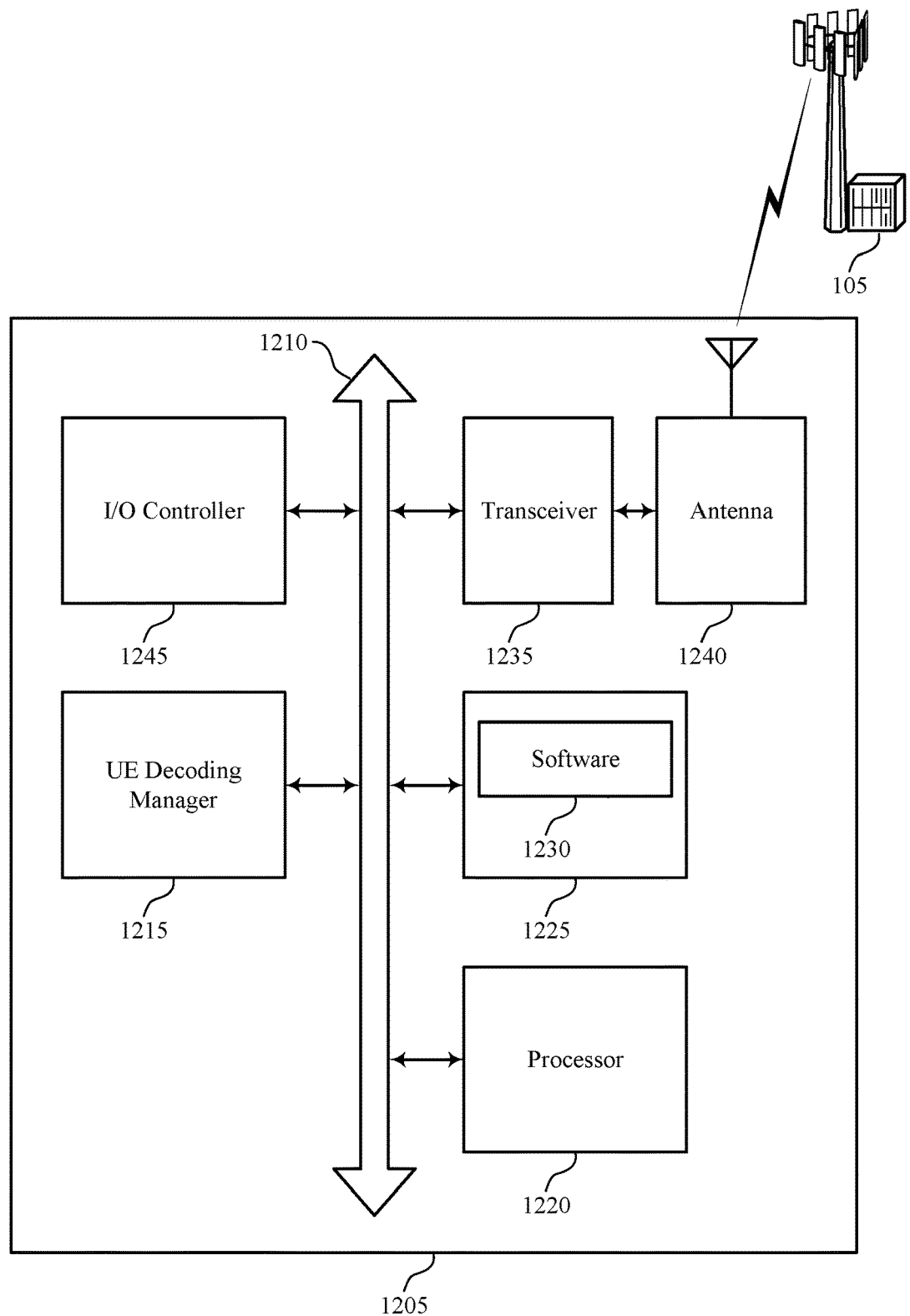
FIG. 12 illustrates a block diagram of a system including a UE that supports a search space configuration and decoding in accordance with aspects of the present disclosure.

FIG. 12 shows a diagram of a system 1200 including a device 1205 that supports search space for a decoder in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE decoding manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting search space for a decoder).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support search space for a decoder. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
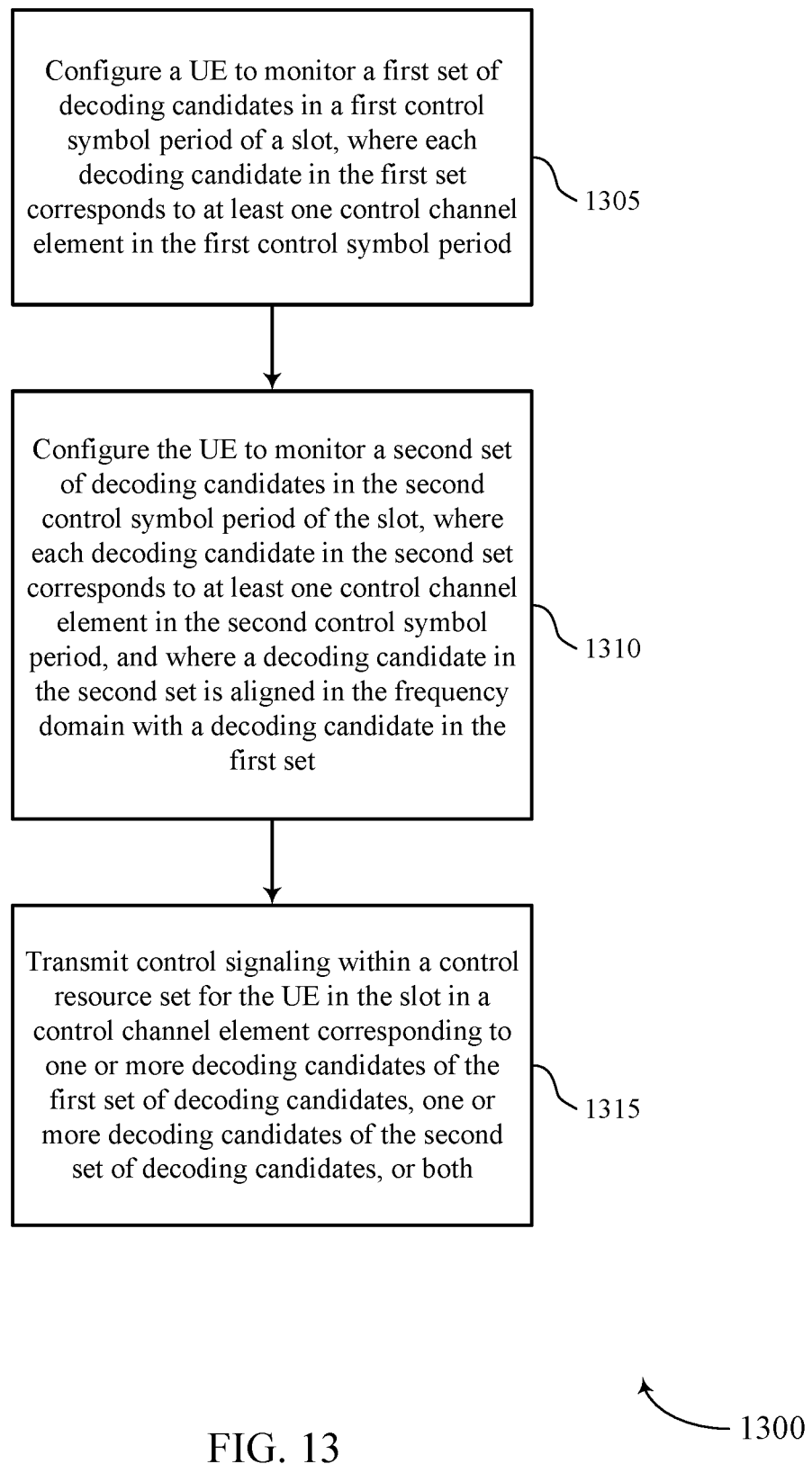
FIGS. 13 through 21 illustrate methods for search space configuration and decoding in accordance with aspects of the present disclosure.

FIG. 13 shows a flowchart illustrating a method 1300 for search space for a decoder in accordance with various aspects of the present disclosure. The operations of method 1300 may be implemented by a base station 105 or its components as described herein. For example, the operations of method 1300 may be performed by a base station decoding manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may configure a UE to monitor a first set of decoding candidates in a first control symbol period of a slot, wherein each decoding candidate in the first set corresponds to at least one control channel element in the first control symbol period. The operations of block 1305 may be performed according to the methods described with reference to FIGS. 1 through 4. In certain examples, aspects of the operations of block 1305 may be performed by a decoding candidate component as described with reference to FIGS. 5 through 8.

At block 1310 the base station 105 may configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set. The operations of block 1310 may be performed according to the methods described with reference to FIGS. 1 through 4. In certain examples, aspects of the operations of block 1310 may be performed by a decoding candidate component as described with reference to FIGS. 5 through 8.

At block 1315 the base station 105 may transmit control signaling within a control resource set for the UE in the slot in a control channel element corresponding to one or more decoding candidates of the first set of decoding candidates, one or more decoding candidates of the second set of decoding candidates, or both. The operations of block 1315 may be performed according to the methods described with reference to FIGS. 1 through 4. In certain examples, aspects of the operations of block 1315 may be performed by a control signal component as described with reference to FIGS. 5 through 8.

Figure 14:
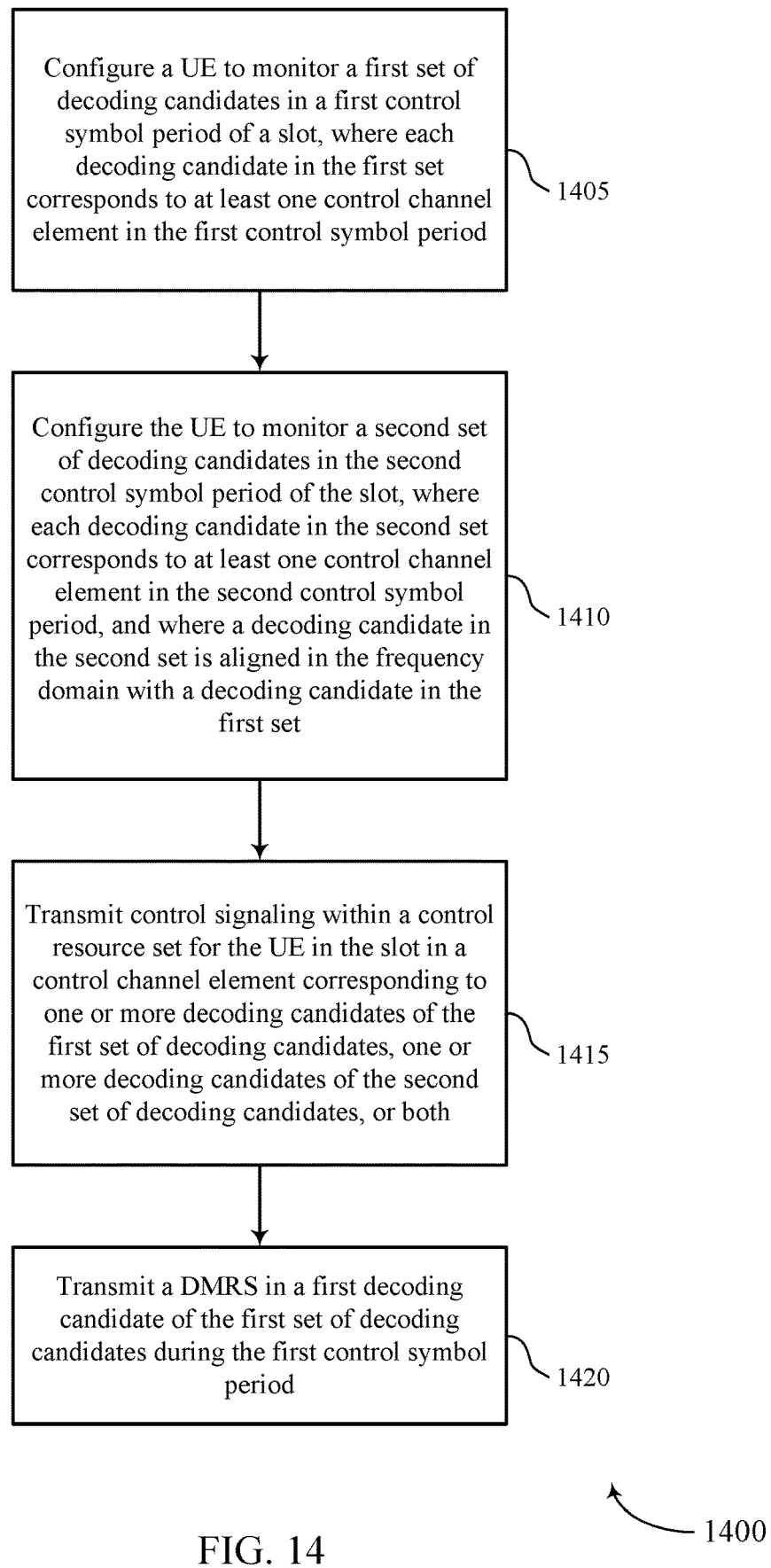

FIG. 14 shows a flowchart illustrating a method 1400 for search space for a decoder in accordance with various aspects of the present disclosure. The operations of method 1400 may be implemented by a base station 105 or its components as described herein. For example, the operations of method 1400 may be performed by a base station decoding manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may configure a UE to monitor a first set of decoding candidates in a first control symbol period of a slot, wherein each decoding candidate in the first set corresponds to at least one control channel element in the first control symbol period. The operations of block 1405 may be performed according to the methods described with reference to FIGS. 1 through 4. In certain examples, aspects of the operations of block 1405 may be performed by a decoding candidate component as described with reference to FIGS. 5 through 8.

At block 1410 the base station 105 may configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set. The operations of block 1410 may be performed according to the methods described with reference to FIGS. 1 through 4. In certain examples, aspects of the operations of block 1410 may be performed by a decoding candidate component as described with reference to FIGS. 5 through 8.

At block 1415 the base station 105 may transmit control signaling within a control resource set for the UE in the slot in a control channel element corresponding to one or more decoding candidates of the first set of decoding candidates, one or more decoding candidates of the second set of decoding candidates, or both. The operations of block 1415 may be performed according to the methods described with reference to FIGS. 1 through 4. In certain examples, aspects of the operations of block 1415 may be performed by a control signal component as described with reference to FIGS. 5 through 8.

At block 1420 the base station 105 may transmit a DMRS in a first decoding candidate of the first set of decoding candidates during the first control symbol period. The operations of block 1420 may be performed according to the methods described with reference to FIGS. 1 through 4. In certain examples, aspects of the operations of block 1420 may be performed by a DMRS component as described with reference to FIGS. 5 through 8.

Figure 15:
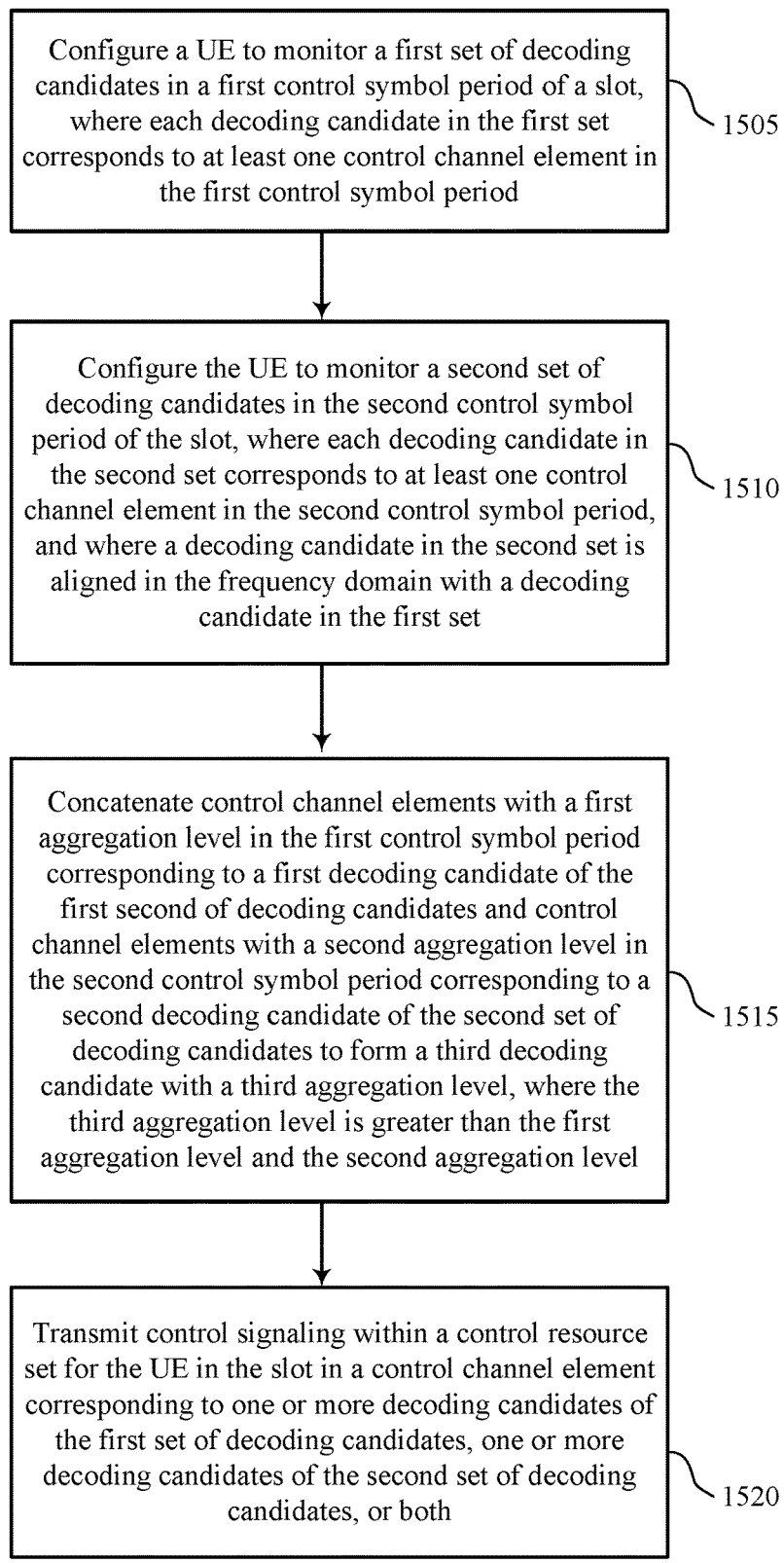

FIG. 15 shows a flowchart illustrating a method 1500 for search space for a decoder in accordance with various aspects of the present disclosure. The operations of method 1500 may be implemented by a base station 105 or its components as described herein. For example, the operations of method 1500 may be performed by a base station decoding manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may configure a UE to monitor a first set of decoding candidates in a first control symbol period of a slot, wherein each decoding candidate in the first set corresponds to at least one control channel element in the first control symbol period. The operations of block 1505 may be performed according to the methods described with reference to FIGS. 1 through 4. In certain examples, aspects of the operations of block 1505 may be performed by a decoding candidate component as described with reference to FIGS. 5 through 8.

At block 1510 the base station 105 may configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set. The operations of block 1510 may be performed according to the methods described with reference to FIGS. 1 through 4. In certain examples, aspects of the operations of block 1510 may be performed by a decoding candidate component as described with reference to FIGS. 5 through 8.

At block 1515 the base station 105 may concatenate control channel elements with a first aggregation level in the first control symbol period corresponding to a first decoding candidate of the first second of decoding candidates and control channel elements with a second aggregation level in the second control symbol period corresponding to a second decoding candidate of the second set of decoding candidates to form a third decoding candidate with a third aggregation level, wherein the third aggregation level is greater than the first aggregation level and the second aggregation level. The operations of block 1515 may be performed according to the methods described with reference to FIGS. 1 through 4. In certain examples, aspects of the operations of block 1515 may be performed by a aggregation level component as described with reference to FIGS. 5 through 8.

At block 1520 the base station 105 may transmit control signaling within a control resource set for the UE in the slot in a control channel element corresponding to one or more decoding candidates of the first set of decoding candidates, one or more decoding candidates of the second set of decoding candidates, or both. The operations of block 1520 may be performed according to the methods described with reference to FIGS. 1 through 4. In certain examples, aspects of the operations of block 1520 may be performed by a control signal component as described with reference to FIGS. 5 through 8.

Figure 16:
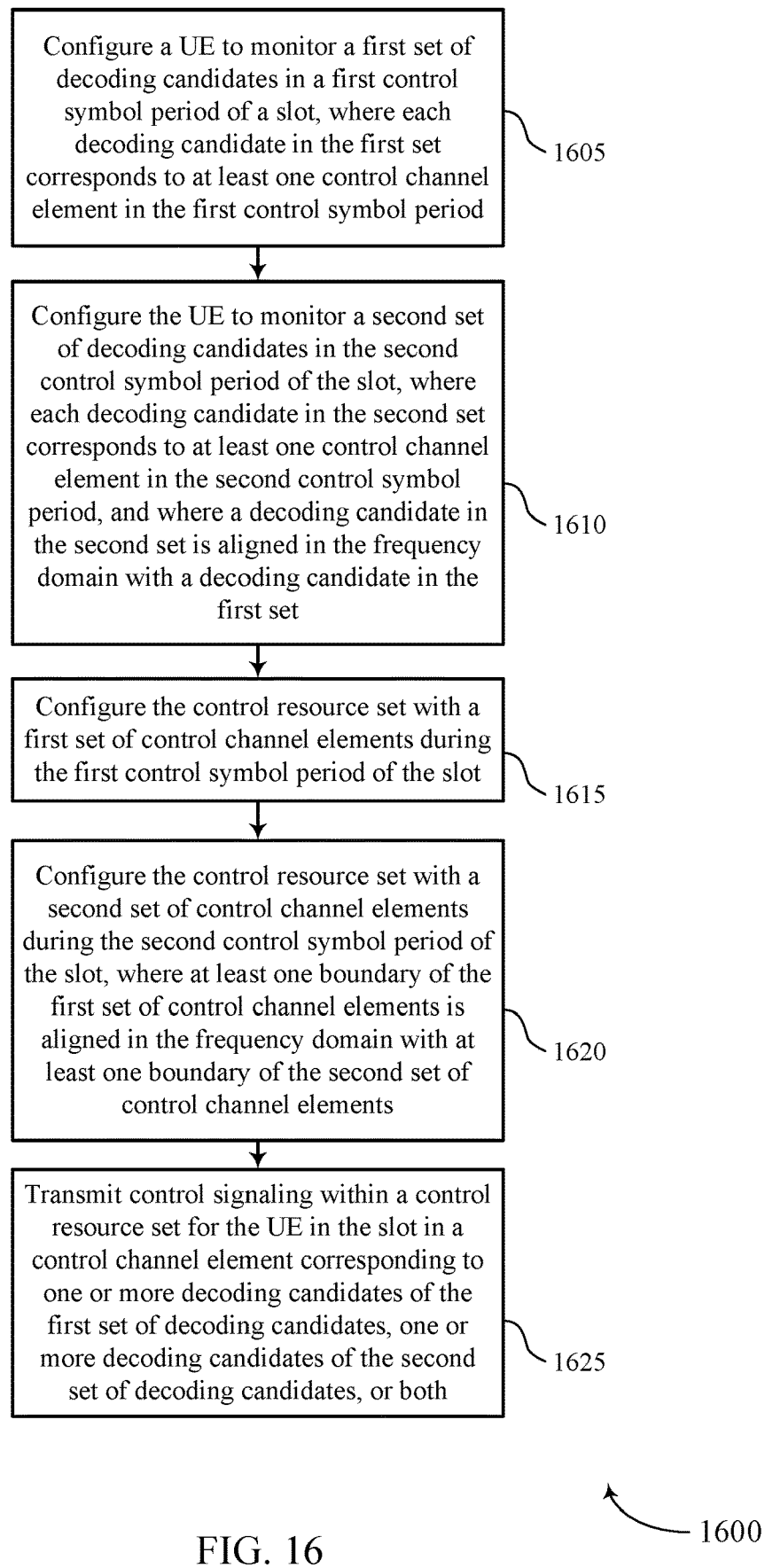

FIG. 16 shows a flowchart illustrating a method 1600 for search space for a decoder in accordance with various aspects of the present disclosure. The operations of method 1600 may be implemented by a base station 105 or its components as described herein. For example, the operations of method 1600 may be performed by a base station decoding manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may configure a UE to monitor a first set of decoding candidates in a first control symbol period of a slot, wherein each decoding candidate in the first set corresponds to at least one control channel element in the first control symbol period. The operations of block 1605 may be performed according to the methods described with reference to FIGS. 1 through 4. In certain examples, aspects of the operations of block 1605 may be performed by a decoding candidate component as described with reference to FIGS. 5 through 8.

At block 1610 the base station 105 may configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set. The operations of block 1610 may be performed according to the methods described with reference to FIGS. 1 through 4. In certain examples, aspects of the operations of block 1610 may be performed by a decoding candidate component as described with reference to FIGS. 5 through 8.

At block 1615 the base station 105 may configure the control resource set with a first set of control channel elements during the first control symbol period of the slot. The operations of block 1615 may be performed according to the methods described with reference to FIGS. 1 through 4. In certain examples, aspects of the operations of block 1615 may be performed by a control resource component as described with reference to FIGS. 5 through 8.

At block 1620 the base station 105 may configure the control resource set with a second set of control channel elements during the second control symbol period of the slot, wherein at least one boundary of the first set of control channel elements is aligned in the frequency domain with at least one boundary of the second set of control channel elements. The operations of block 1620 may be performed according to the methods described with reference to FIGS. 1 through 4. In certain examples, aspects of the operations of block 1620 may be performed by a control resource component as described with reference to FIGS. 5 through 8.

At block 1625 the base station 105 may transmit control signaling within a control resource set for the UE in the slot in a control channel element corresponding to one or more decoding candidates of the first set of decoding candidates, one or more decoding candidates of the second set of decoding candidates, or both. The operations of block 1625 may be performed according to the methods described with reference to FIGS. 1 through 4. In certain examples, aspects of the operations of block 1625 may be performed by a control signal component as described with reference to FIGS. 5 through 8.

Figure 17:
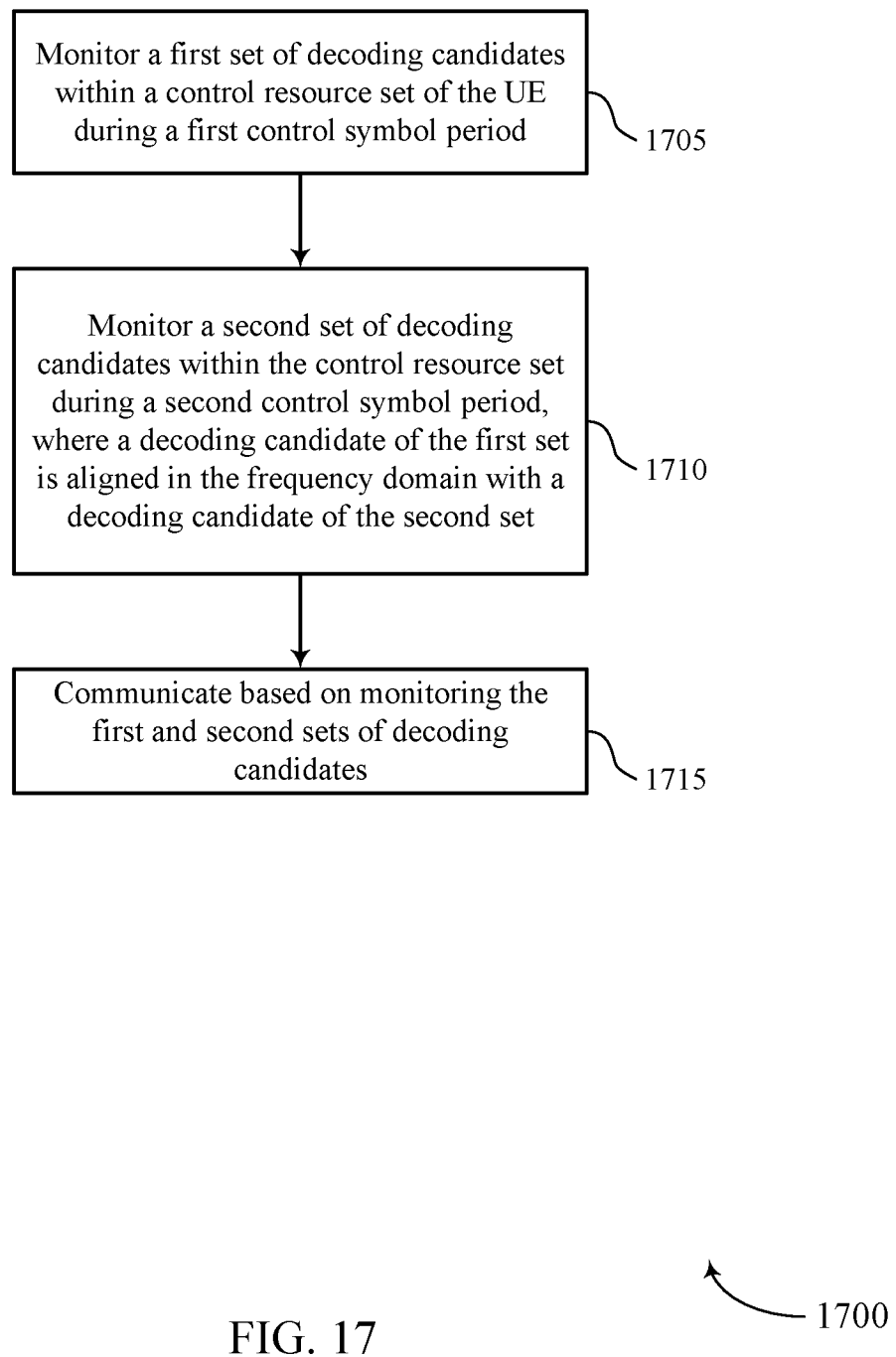

FIG. 17 shows a flowchart illustrating a method 1700 for search space for a decoder in accordance with various aspects of the present disclosure. The operations of method 1700 may be implemented by a UE 115 or its components as described herein. For example, the operations of method 1700 may be performed by a UE decoding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may monitor a first set of decoding candidates within a control resource set of the UE during a first control symbol period. The operations of block 1705 may be performed according to the methods described with reference to FIGS. 1 through 4. In certain examples, aspects of the operations of block 1705 may be performed by a decoding candidate component as described with reference to FIGS. 9 through 12.

At block 1710 the UE 115 may monitor a second set of decoding candidates within the control resource set during a second control symbol period, wherein a decoding candidate of the first set is aligned in the frequency domain with a decoding candidate of the second set. The operations of block 1710 may be performed according to the methods described with reference to FIGS. 1 through 4. In certain examples, aspects of the operations of block 1710 may be performed by a decoding candidate component as described with reference to FIGS. 9 through 12.

At block 1715 the UE 115 may communicate based on monitoring the first and second sets of decoding candidates. The operations of block 1715 may be performed according to the methods described with reference to FIGS. 1 through 4. In certain examples, aspects of the operations of block 1715 may be performed by a communications manager as described with reference to FIGS. 9 through 12.

Figure 18:
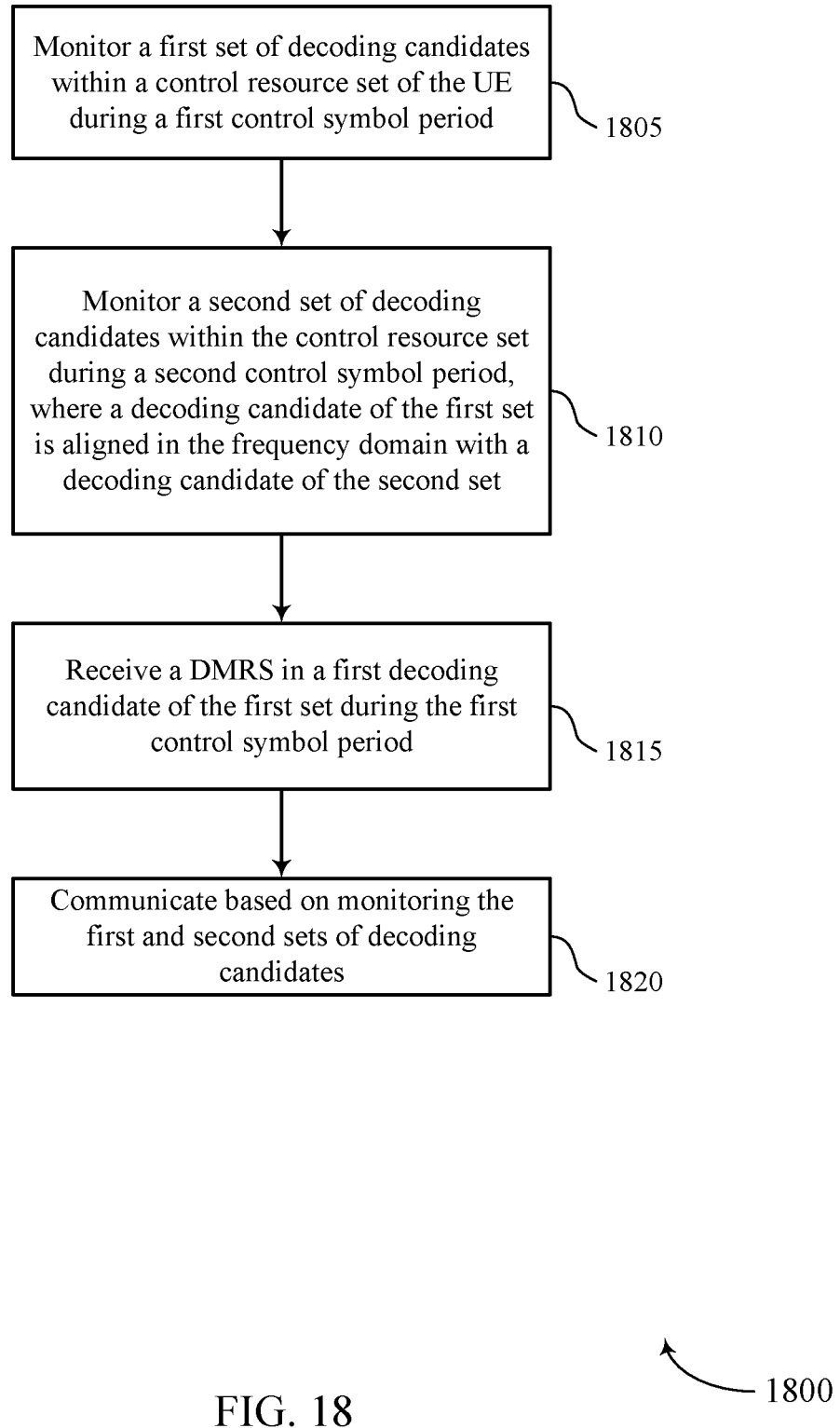

FIG. 18 shows a flowchart illustrating a method 1800 for search space for a decoder in accordance with various aspects of the present disclosure. The operations of method 1800 may be implemented by a UE 115 or its components as described herein. For example, the operations of method 1800 may be performed by a UE decoding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may monitor a first set of decoding candidates within a control resource set of the UE during a first control symbol period. The operations of block 1805 may be performed according to the methods described with reference to FIGS. 1 through 4. In certain examples, aspects of the operations of block 1805 may be performed by a decoding candidate component as described with reference to FIGS. 9 through 12.

At block 1810 the UE 115 may monitor a second set of decoding candidates within the control resource set during a second control symbol period, wherein a decoding candidate of the first set is aligned in the frequency domain with a decoding candidate of the second set. The operations of block 1810 may be performed according to the methods described with reference to FIGS. 1 through 4. In certain examples, aspects of the operations of block 1810 may be performed by a decoding candidate component as described with reference to FIGS. 9 through 12.

At block 1815 the UE 115 may receive a DMRS in a first decoding candidate of the first set during the first control symbol period. The operations of block 1815 may be performed according to the methods described with reference to FIGS. 1 through 4. In certain examples, aspects of the operations of block 1815 may be performed by a DMRS component as described with reference to FIGS. 9 through 12.

At block 1820 the UE 115 may communicate based on monitoring the first and second sets of decoding candidates. The operations of block 1820 may be performed according to the methods described with reference to FIGS. 1 through 4. In certain examples, aspects of the operations of block 1820 may be performed by a communications manager as described with reference to FIGS. 9 through 12.

Figure 19:
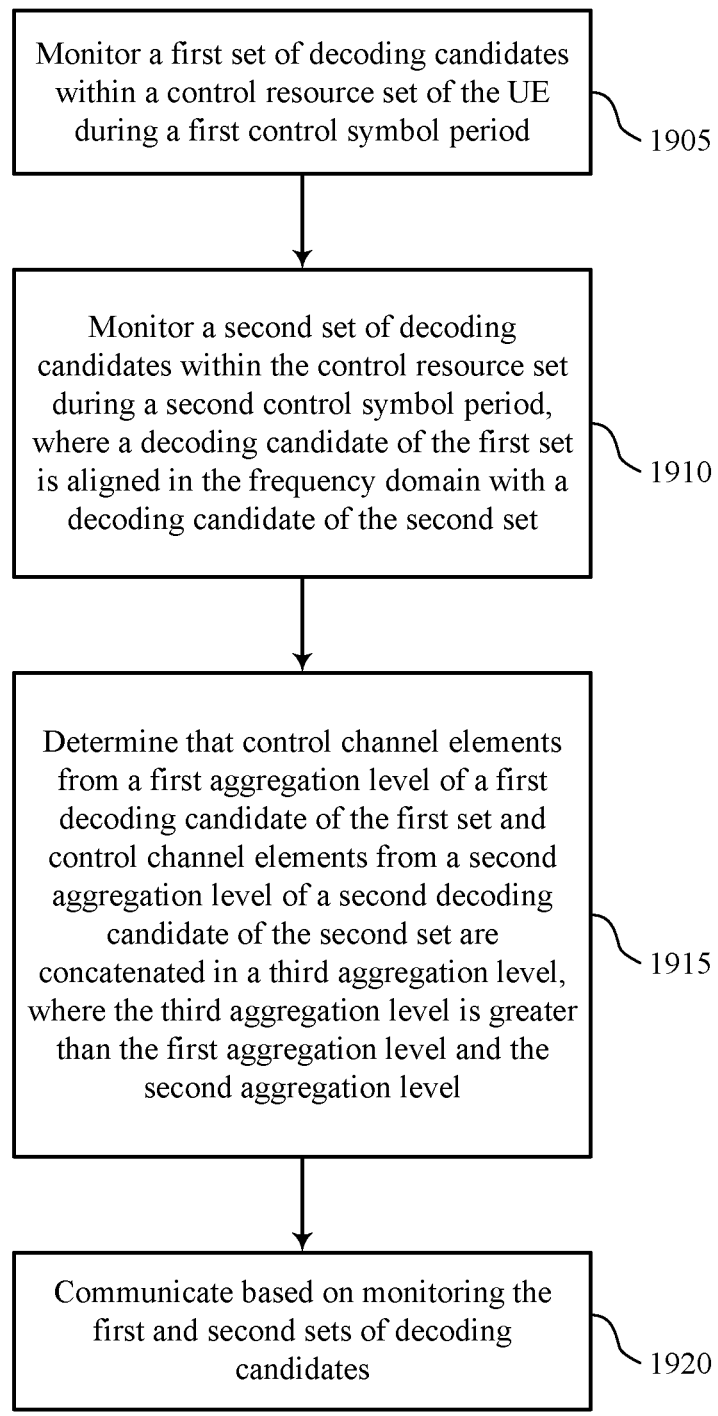

FIG. 19 shows a flowchart illustrating a method 1900 for search space for a decoder in accordance with various aspects of the present disclosure. The operations of method 1900 may be implemented by a UE 115 or its components as described herein. For example, the operations of method 1900 may be performed by a UE decoding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may monitor a first set of decoding candidates within a control resource set of the UE during a first control symbol period. The operations of block 1905 may be performed according to the methods described with reference to FIGS. 1 through 4. In certain examples, aspects of the operations of block 1905 may be performed by a decoding candidate component as described with reference to FIGS. 9 through 12.

At block 1910 the UE 115 may monitor a second set of decoding candidates within the control resource set during a second control symbol period, wherein a decoding candidate of the first set is aligned in the frequency domain with a decoding candidate of the second set. The operations of block 1910 may be performed according to the methods described with reference to FIGS. 1 through 4. In certain examples, aspects of the operations of block 1910 may be performed by a decoding candidate component as described with reference to FIGS. 9 through 12.

At block 1915 the UE 115 may determine that control channel elements from a first aggregation level of a first decoding candidate of the first set and control channel elements from a second aggregation level of a second decoding candidate of the second set are concatenated in a third aggregation level, wherein the third aggregation level is greater than the first aggregation level and the second aggregation level. The operations of block 1915 may be performed according to the methods described with reference to FIGS. 1 through 4. In certain examples, aspects of the operations of block 1915 may be performed by a concatenated aggregation level component as described with reference to FIGS. 9 through 12.

At block 1920 the UE 115 may communicate based on monitoring the first and second sets of decoding candidates. The operations of block 1920 may be performed according to the methods described with reference to FIGS. 1 through 4. In certain examples, aspects of the operations of block 1920 may be performed by a communications manager as described with reference to FIGS. 9 through 12.

Figure 20:
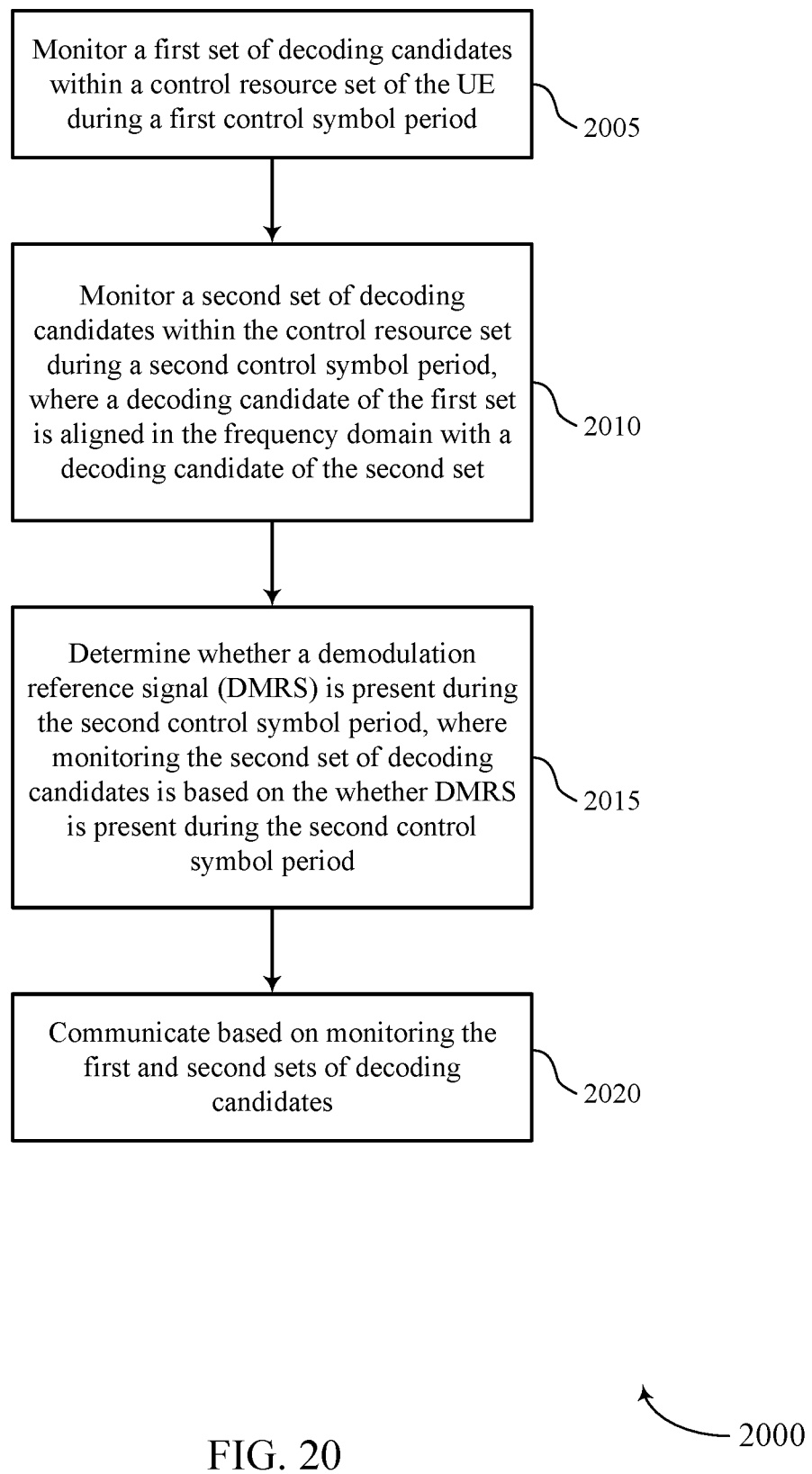

FIG. 20 shows a flowchart illustrating a method 2000 for search space for a decoder in accordance with various aspects of the present disclosure. The operations of method 2000 may be implemented by a UE 115 or its components as described herein. For example, the operations of method 2000 may be performed by a UE decoding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may monitor a first set of decoding candidates within a control resource set of the UE during a first control symbol period. The operations of block 2005 may be performed according to the methods described with reference to FIGS. 1 through 4. In certain examples, aspects of the operations of block 2005 may be performed by a decoding candidate component as described with reference to FIGS. 9 through 12.

At block 2010 the UE 115 may monitor a second set of decoding candidates within the control resource set during a second control symbol period, wherein a decoding candidate of the first set is aligned in the frequency domain with a decoding candidate of the second set. The operations of block 2010 may be performed according to the methods described with reference to FIGS. 1 through 4. In certain examples, aspects of the operations of block 2010 may be performed by a decoding candidate component as described with reference to FIGS. 9 through 12.

At block 2015 the UE 115 may determine whether a DMRS is present during the second control symbol period, wherein monitoring the second set of decoding candidates is based on whether DMRS is present during the second control symbol period. The operations of block 2015 may be performed according to the methods described with reference to FIGS. 1 through 4. In certain examples, aspects of the operations of block 2015 may be performed by a DMRS indication component as described with reference to FIGS. 9 through 12.

At block 2020 the UE 115 may communicate based on monitoring the first and second sets of decoding candidates. The operations of block 2020 may be performed according to the methods described with reference to FIGS. 1 through 4. In certain examples, aspects of the operations of block 2020 may be performed by a communications manager as described with reference to FIGS. 9 through 12.

Figure 21:
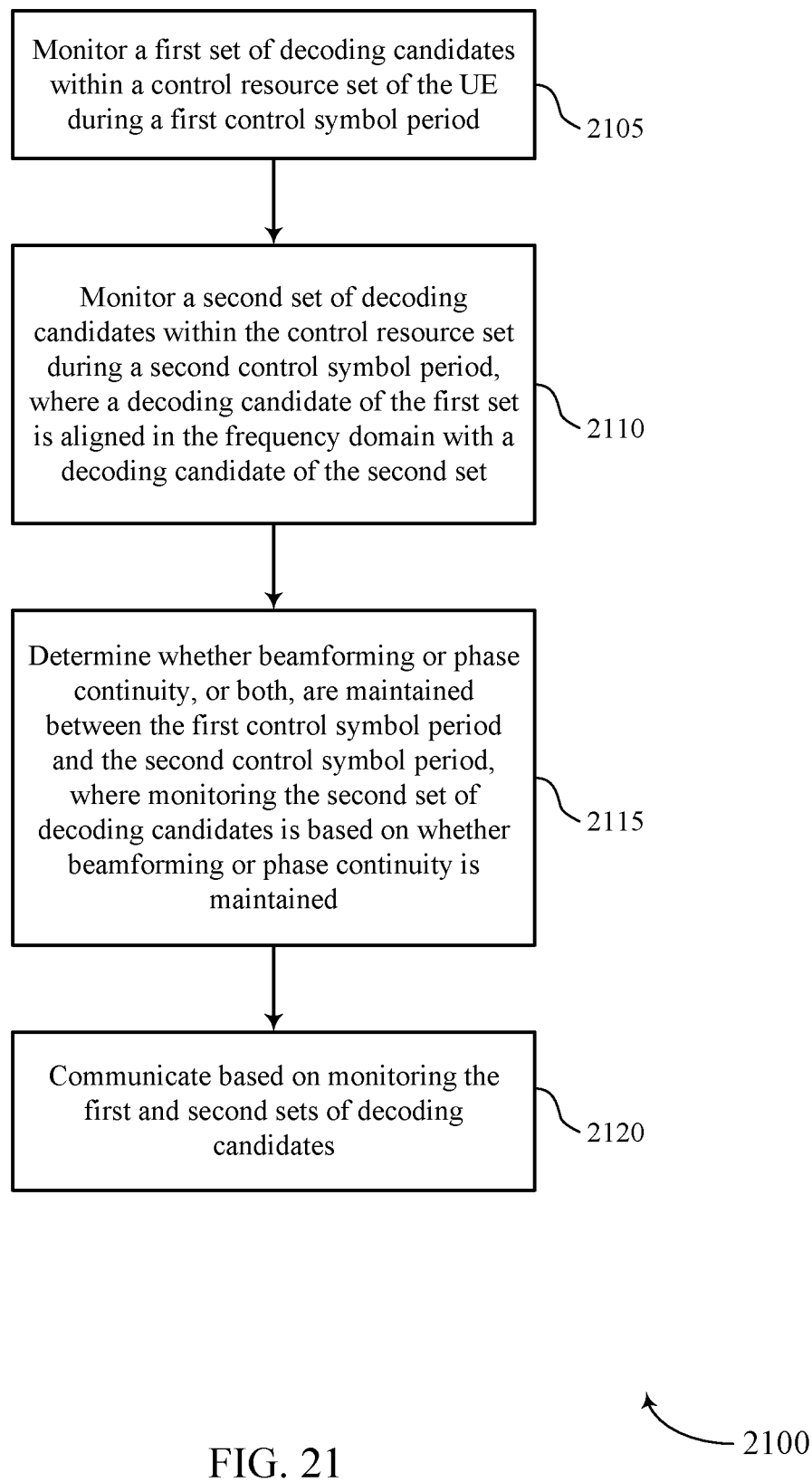

FIG. 21 shows a flowchart illustrating a method 2100 for search space for a decoder in accordance with various aspects of the present disclosure. The operations of method 2100 may be implemented by a UE 115 or its components as described herein. For example, the operations of method 2100 may be performed by a UE decoding manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2105 the UE 115 may monitor a first set of decoding candidates within a control resource set of the UE during a first control symbol period. The operations of block 2105 may be performed according to the methods described with reference to FIGS. 1 through 4. In certain examples, aspects of the operations of block 2105 may be performed by a decoding candidate component as described with reference to FIGS. 9 through 12.

At block 2110 the UE 115 may monitor a second set of decoding candidates within the control resource set during a second control symbol period, wherein a decoding candidate of the first set is aligned in the frequency domain with a decoding candidate of the second set. The operations of block 2110 may be performed according to the methods described with reference to FIGS. 1 through 4. In certain examples, aspects of the operations of block 2110 may be performed by a decoding candidate component as described with reference to FIGS. 9 through 12.

At block 2115 the UE 115 may determine whether beamforming or phase continuity, or both, are maintained between the first control symbol period and the second control symbol period, wherein monitoring the second set of decoding candidates is based on whether beamforming or phase continuity is maintained. The operations of block 2115 may be performed according to the methods described with reference to FIGS. 1 through 4. In certain examples, aspects of the operations of block 2115 may be performed by a beamforming indication component as described with reference to FIGS. 9 through 12.

At block 2120 the UE 115 may communicate based on monitoring the first and second sets of decoding candidates. The operations of block 2120 may be performed according to the methods described with reference to FIGS. 1 through 4. In certain examples, aspects of the operations of block 2120 may be performed by a communications manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
configuring a user equipment (UE) to monitor a first set of decoding candidates in a first control symbol period of a slot, wherein each decoding candidate in the first set corresponds to at least one control channel element in the first control symbol period;

configuring the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set; and transmitting control signaling within a control resource set for the UE in the slot in a control channel element corresponding to one or more decoding candidates of the first set of decoding candidates, one or more decoding candidates of the second set of decoding candidates, or both.

2. The method of claim 1, wherein the second set of decoding candidates comprises a repetition of an arrangement of the first set of decoding candidates such that decoding candidates for the UE in the second set are frequency-aligned with decoding candidates in the first set.

3. The method of claim 2, wherein the decoding candidates are defined by one or more aggregation levels in a search space comprising a first set of control channel elements in the first control symbol period and a second set of control channel elements in the second control symbol period.

4. The method of claim 1, wherein the first set of decoding candidates and the second set of decoding candidates occupy a same set of frequency resources.

5. The method of claim 1, further comprising:
transmitting a demodulation reference signal (DMRS) in a first decoding candidate of the first set of decoding candidates during the first control symbol period, wherein the DMRS transmitted in a first decoding candidate of the first set aids in decoding a second decoding candidate of the second set of decoding candidates that is frequency-aligned with the first decoding candidate.

6. The method of claim 5, further comprising:
transmitting a grant of resources for the UE in a control channel element of the first control symbol period corresponding to the first decoding candidate; and
determining to leave empty a control channel element of the second control symbol period corresponding to the second decoding candidate.

7. The method of claim 1, further comprising:
transmitting a demodulation reference signal (DMRS) in a first decoding candidate of the first set of decoding candidates during the first control symbol period;
transmitting, in the second control symbol period, a separate DMRS in a second decoding candidate of the second set of decoding candidates, wherein the DMRS transmitted during each of the first and second control symbol periods has a same pattern.

8. The method of claim 7, further comprising:
transmitting a first grant of resources for the UE in a control channel element of the first control symbol period corresponding to the first decoding candidate and a second grant of resources for the first UE in a control channel element of the second control symbol corresponding to the second decoding candidate.

9. The method of claim 1, further comprising:
concatenating control channel elements with a first aggregation level in the first control symbol period corresponding to a first decoding candidate of the first second of decoding candidates and control channel elements with a second aggregation level in the second control symbol period corresponding to a second decoding candidate of the second set of decoding candidates to form a third decoding candidate with a third aggregation level, wherein the third aggregation level is greater than the first aggregation level and the second aggregation level.

10. The method of claim 9, further comprising:
determining that the control resource set for the UE is less than a minimum bandwidth for the third aggregation level, wherein the first and second aggregation levels are concatenated based at least in part on the determination.

11. The method of claim 1, further comprising:
configuring the control resource set with a first set of control channel elements during the first control symbol period of the slot; and
configuring the control resource set with a second set of control channel elements during the second control symbol period of the slot, wherein at least one boundary of the first set of control channel elements is aligned in the frequency domain with at least one boundary of the second set of control channel elements.

12. The method of claim 11, further comprising:
transmitting an indication of whether a demodulation reference signal (DMRS) is present during the second control symbol period, wherein the configuration of the control resource set during the second control symbol period is based at least in part on whether DMRS is present during the second control symbol period.

13. The method of claim 11, further comprising:
transmitting an indication of whether beamforming or phase continuity, or both, are maintained between the first control symbol period and the second control symbol period, wherein the configuration of the control resource set during the second control symbol period is based at least in part on whether beamforming or phase continuity is maintained.

14. A method for wireless communication, comprising:
monitoring a first set of decoding candidates within a control resource set of the UE during a first control symbol period;
monitoring a second set of decoding candidates within the control resource set during a second control symbol period, wherein a decoding candidate of the first set is aligned in the frequency domain with a decoding candidate of the second set; and
communicating based at least in part on monitoring the first and second sets of decoding candidates.

15. The method of claim 14, wherein the second set of decoding candidates comprises a repetition of an arrangement of the first set of decoding candidates such that decoding candidates in the second set are frequency-aligned with decoding candidates in the first set.

16. The method of claim 14, wherein the first set of decoding candidates and the second set of decoding candidates occupy a same set of frequency resources.

17. The method of claim 14, further comprising:
receiving a demodulation reference signal (DMRS) in a first decoding candidate of the first set during the first control symbol period.

18. The method of claim 17, further comprising:
receiving the DMRS in a second decoding candidate of the second set during the second control symbol period, wherein the DMRS received in the first control symbol period has a same pattern as the DMRS received in the second control symbol period.

19. The method of claim 18, further comprising:
receiving a first grant of resources for the UE in the first decoding candidate and a second grant of resource for the UE in the second decoding candidate.

20. The method of claim 19, wherein the first grant comprises an assignment of resources in the slot and the second grant comprises an assignment of resources in a subsequent slot.

21. The method of claim 14, further comprising:
determining that control channel elements from a first aggregation level of a first decoding candidate of the first set and control channel elements from a second aggregation level of a second decoding candidate of the second set are concatenated in a third aggregation level, wherein the third aggregation level is greater than the first aggregation level and the second aggregation level, wherein the first aggregation level and the second aggregation level are a same aggregation level.

22. The method of claim 21, wherein the first aggregation level and the second aggregation level are a same aggregation level.

23. The method of claim 21, wherein the third aggregation level comprises an integer multiple of the first aggregation level, the second aggregation level, or both.

24. The method of claim 21, wherein the third aggregation level comprises an aggregation level equivalent to a sum of the first aggregation level and the second aggregation level.

25. The method of claim 21, wherein the control resource set is less than a minimum bandwidth for the third aggregation level.

26. The method of claim 14, further comprising:
determining whether a demodulation reference signal (DMRS) is present during the second control symbol period, wherein monitoring the second set of decoding candidates is based at least in part on whether DMRS is present during the second control symbol period.

27. The method of claim 14, further comprising:
determining whether beamforming or phase continuity, or both, are maintained between the first control symbol period and the second control symbol period, wherein monitoring the second set of decoding candidates is based at least in part on whether beamforming or phase continuity is maintained.

28. The method of claim 27, further comprising:
performing joint channel estimation for the first set of decoding candidates and the second set of decoding candidates based at least in part on determining that beamforming or phase continuity, or both, are maintained between the first control symbol period and the second control symbol period.

29. An apparatus for wireless communication, comprising:
a processor;
memory in electronic communication with the processor; and
instructions stored in the memory and operable, when executed by the processor, to cause the apparatus to:
configure a user equipment (UE) to monitor a first set of decoding candidates in a first control symbol period of a slot, wherein each decoding candidate in the first set corresponds to at least one control channel element in the first control symbol period;
configure the UE to monitor a second set of decoding candidates in the second control symbol period of the slot, wherein each decoding candidate in the second set corresponds to at least one control channel element in the second control symbol period, and wherein a decoding candidate in the second set is aligned in the frequency domain with a decoding candidate in the first set; and
transmit control signaling within a control resource set for the UE in the slot in a control channel element corresponding to one or more decoding candidates of the first set of decoding candidates, one or more decoding candidates of the second set of decoding candidates, or both.

30. An apparatus for wireless communication, in a system comprising:
a processor;
memory in electronic communication with the processor; and
instructions stored in the memory and operable, when executed by the processor, to cause the apparatus to:
monitor a first set of decoding candidates within a control resource set of the UE during a first control symbol period;
monitor a second set of decoding candidates within the control resource set during a second control symbol period, wherein a decoding candidate of the first set is aligned in the frequency domain with a decoding candidate of the second set; and
communicate based at least in part on monitoring the first and second sets of decoding candidates.

* * * * *